US011769345B2

(12) United States Patent
Raguin et al.

(10) Patent No.: US 11,769,345 B2
(45) Date of Patent: Sep. 26, 2023

(54) PRESENTATION ATTACK DETECTION

(71) Applicant: HID Global Corporation, Austin, TX (US)

(72) Inventors: Daniel Henri Raguin, North Palm Beach, FL (US); George William McClurg, Jensen Beach, FL (US); Aleksei Caesare Sebastiani, West Palm Beach, FL (US); Markus Johannes Schiefele, Huntly, VA (US); Gregory Lewis Cannon, Lake Worth, FL (US)

(73) Assignee: HID Global Corporation, Austin, TX (US)

( * ) Notice: Subject to any disclaimer, the term of this patent is extended or adjusted under 35 U.S.C. 154(b) by 79 days.

(21) Appl. No.: 17/594,931

(22) PCT Filed: May 7, 2020

(86) PCT No.: PCT/EP2020/062745
§ 371 (c)(1),
(2) Date: Nov. 3, 2021

(87) PCT Pub. No.: WO2020/225376
PCT Pub. Date: Nov. 12, 2020

(65) Prior Publication Data
US 2022/0207909 A1 Jun. 30, 2022

Related U.S. Application Data

(60) Provisional application No. 62/844,576, filed on May 7, 2019.

(51) Int. Cl.
*G06V 40/13* (2022.01)
*G06V 40/12* (2022.01)
(Continued)

(52) U.S. Cl.
CPC ....... *G06V 40/1324* (2022.01); *G02B 6/0033* (2013.01); *G06V 10/143* (2022.01);
(Continued)

(58) Field of Classification Search
CPC ............. G06V 40/1324; G06V 10/143; G06V 10/145; G06V 10/774; G06V 40/1318; G06V 40/1394; G02B 6/0033
See application file for complete search history.

(56) References Cited

U.S. PATENT DOCUMENTS 9,400,916 B1  7/2016  Brownlee
9,727,774 B2  8/2017  Brownlee
(Continued)

FOREIGN PATENT DOCUMENTS

WO  WO-2018231856 A1  12/2018
WO  WO-2020225376 A1  11/2020

OTHER PUBLICATIONS

"International Application Serial No. PCT/EP2020/062745, International Search Report dated Oct. 15, 2020", 7 pgs.
(Continued)

*Primary Examiner* — Abhishek Sarma
(74) *Attorney, Agent, or Firm* — Schwegman Lundberg & Woessner, P.A.

(57) ABSTRACT

An apparatus for capturing an image of an object on a platen and including a platen having a surface for receiving the object, wherein the platen is transmissive to an optical wavelength of light, an illumination module configured to illuminate at least a portion of the object with light from an illumination source, and an optical sensing module configured to receive the light from the illumination source after the light interacts with the at least a portion of the object. The light from the illumination source is spatially patterned prior to reaching the object. The illumination module can be
(Continued)

configured to create the spatially patterned illumination and/or the platen may include a patterned optical coating creating the spatially patterned illumination. The spatially patterned illumination can include a plurality of discrete areas (e.g., a stepped pattern) of different illumination intensity and/or a gradient of different illumination intensity.

20 Claims, 16 Drawing Sheets

(51) Int. Cl.
*G06V 10/143* (2022.01)
*G06V 10/774* (2022.01)
*G06V 10/145* (2022.01)
*F21V 8/00* (2006.01)

(52) U.S. Cl.
CPC .......... *G06V 10/145* (2022.01); *G06V 10/774* (2022.01); *G06V 40/1318* (2022.01); *G06V 40/1394* (2022.01)

(56) References Cited

U.S. PATENT DOCUMENTS

| | | |
|---|---|---|
| 2017/0169275 A1 | 6/2017 | Mackey et al. |
| 2017/0220836 A1* | 8/2017 | Phillips ................ G06T 7/74 |
| 2019/0012513 A1 | 1/2019 | Mainguet et al. |

OTHER PUBLICATIONS

"International Application Serial No. PCT/EP2020/062745, Invitation to Pay Additional Fees dated Aug. 24, 2020", 13 pgs.
"International Application Serial No. PCT/EP2020/062745, Written Opinion dated Oct. 15, 2020", 11 pgs.

* cited by examiner

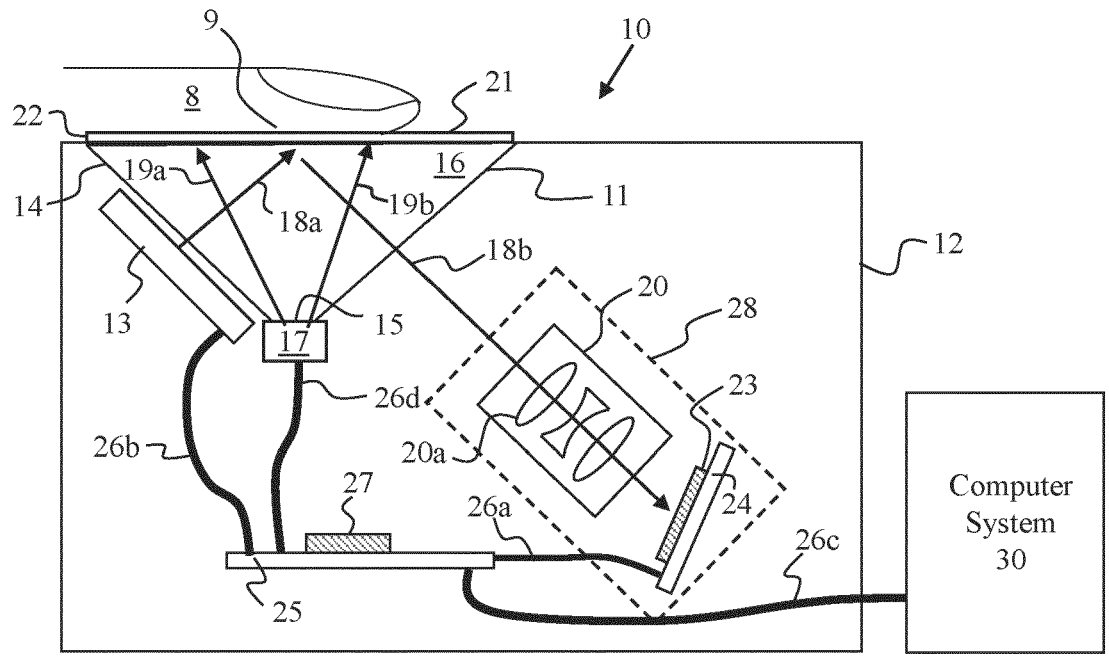
FIG. 1
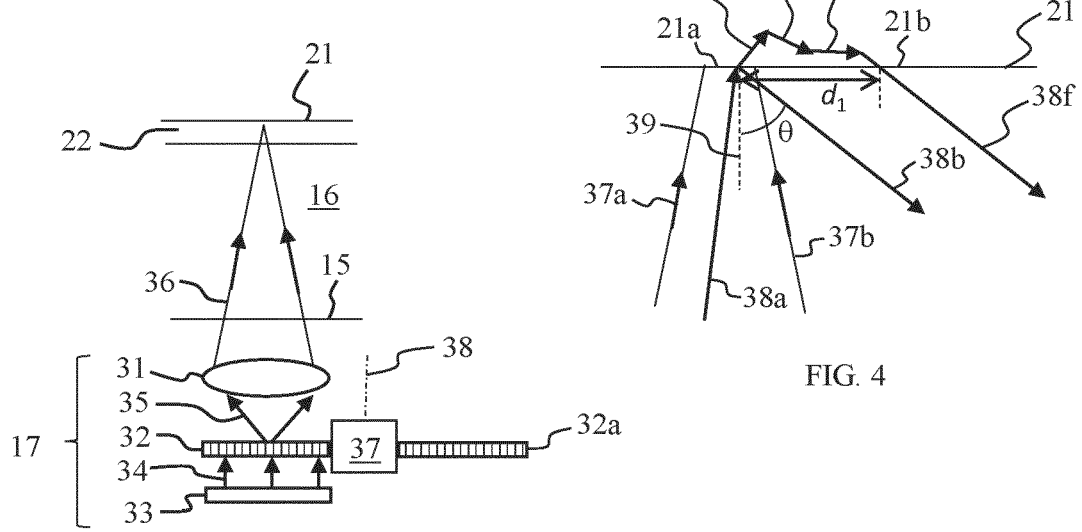
FIG. 2
FIG. 4

(a) Real finger, blue spot (b) Real finger, red spot (c) Gelatin spoof, red spotlight

PRESENTATION ATTACK DETECTION

CROSS-REFERENCE TO RELATED APPLICATION(S)

The present application is a national stage application under 35 U.S.C. § 371 of PCT Application No. PCT/EP2020/062745, titled "Presentation Attack Detection," filed May 7, 2020, which claims the benefit of U.S. Provisional Patent Application No. 62/844,576, titled "Presentation Attack Detection," filed May 7, 2019, each of which is hereby incorporated by reference herein in its entirety.

GOVERNMENT INTEREST

This invention was made with government support under Contract No. 2017-17020200002 awarded by IARPA R&D Contracts. The government has certain rights in the invention.

TECHNICAL FIELD

The present disclosure relates to fingerprint scanners that incorporate presentation attack detection technology, for example based upon illuminating the platen with a spatially varying light pattern.

BACKGROUND

Fingerprint sensing is now widely used for identification and verification purposes in applications such as border security, access control, time and attendance, and national ID programs, among others. To verify a person's identity, a person's fingerprint may be acquired by a fingerprint sensing device or fingerprint scanner, the output of which may be processed and compared with stored characteristic data of one or more fingerprints, for example to determine whether a match exists. As the use of fingerprint biometrics becomes ubiquitous and the value of being able to evade identification or to impersonate another increases, there is an increased risk that fingerprint scanners will be subject to presentation attacks (PAs). An example presentation attack may involve the use of a fake fingerprint (also referred to herein as a presentation attack instrument (PAI) or a spoof). The fake fingerprint may be fabricated in any number of ways, for example by first molding a real fingerprint in materials such as wax or dental mold material. A cast of the fingerprint mold may then be created out of such materials as silicone, urethane, latex, or wood glue. In another example, the mold may be printed using a high-resolution 3D plotter based upon a photograph of a real finger, photograph of a latent fingerprint, or based upon a synthetic fingerprint created in software. In these mold-cast fabrication scenarios, the PAI may have three-dimensional topology. The PAI may be two dimensional, such as the case where the fake fingerprint is printed onto paper or transparency film.

The need for technology enabling presentation attack detection (PAD), or in other words spoof or fake fingerprint detection, has been recognized.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

According to some embodiments, an apparatus for capturing an image of an object on a platen may comprise a platen having a surface for receiving the object, wherein the platen is transmissive to an optical wavelength of light, an illumination module configured to illuminate at least a portion of the object with light from an illumination source, and an optical sensing module configured to receive the light from the illumination source after the light interacts with the at least a portion of the object. The light from the illumination source is spatially patterned prior to reaching the object. The illumination module can be configured to at least partially create the spatially patterned illumination. For instance, the illumination module may include a patterned object with spatially varying differences in optical transmission or reflection for at least partially creating the spatially patterned illumination. Such patterned object may include patterned chrome on glass slides, patterned printed paper, a wire-EDM, stamped, or lithographically etched through metal sheet, or a screen-printed or lithographically printed substrate. The illumination module can be configured to dynamically change a pattern of the spatially patterned illumination. The platen may include a patterned optical coating at least partially creating the spatially patterned illumination. The optical transmission of such coating can vary as a function of position across the platen. The illumination module can include a lightguide having one or more structured areas that direct light toward the platen to at least partially create the spatially patterned illumination. The one or more structured areas can include reflective mirrors, holograms, diffractive elements, or ground or rough areas of material. The one or more structured areas can be electronically switchable. The spatially patterned illumination can include a plurality of discrete areas of different illumination intensity. For example, the spatially patterned illumination can include at least three discrete areas of different illumination intensity. The spatially patterned illumination can, for instance, include a stepped pattern of discrete areas of different illumination intensity. The spatially patterned illumination may additionally or alternatively include a gradient of different illumination intensity. Such gradient could be ramped or sinusoidal. The spatially patterned illumination may include wavelengths of different color. The optical sensing module can be configured to detect image data corresponding to different color wavelengths, in some cases simultaneously. The optical sensing module can, for example, include a color filter, in some cases a pixelated color filter, aligned to a sensor pixel array. The color filter may include a plurality of selectable filters, each mechanically moveable into and out of an optical path of the sensor pixel array. The object received at the platen can be a portion of human skin, such as at least part of a finger, or it could be a spoof of human skin. Embodiments include a method of using the foregoing apparatus to detect whether the object is a portion of human skin or a presentation attack (e.g., a spoof).

According to some embodiments, a method for training machine learning for presentation attack detection (PAD) may include obtaining a platen image generated from spatially patterned illumination of an object at a platen surface, determining at least a subimage of the platen image and dividing the subimage into a plurality of patches, and feeding the plurality of patches to a PAD machine learning algorithm for training the algorithm. Determining at least a subimage of the platen image may include determining a plurality of subimages of the platen image and dividing each subimage into a plurality of patches. Dividing a given subimage into a plurality of patches may include dividing the given subimage into a plurality of patches based on symmetry of the subimage. Each of the plurality of patches of the given subimage can be centered around a center of the given subimage. Each of the plurality of patches of the given subimage may be a predetermined shape having an end aligned with the center of the given subimage or having an axis of rotation aligned with the center of the given subimage. The predetermined shape may be, for example, a square, rectangle, or triangle. Dividing a given subimage into a plurality of patches can include representing the subimage as a rectangular dataset based on polar coordinates of the subimage and segmenting the rectangular dataset into the plurality of patches of the given subimage. The method can further include orienting the plurality of patches based on symmetry of the subimage such that the plurality of patches are similarly oriented prior to feeding the plurality of patches to the PAD machine learning algorithm. Portions of the patches can overlap or the patches can each be distinct portions of the subimage.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the scope of the present disclosure. Accordingly, the drawings and detailed description are to be regarded as illustrative in nature and not restrictive.

BRIEF DESCRIPTION OF THE DRAWINGS

The drawings illustrate generally, but not by way of limitation, various embodiments discussed in the present document.

FIG. 1 schematically illustrates an example apparatus for capturing one or more fingerprints;

FIG. 2 schematically illustrates an example illumination module;

FIG. 4 schematically illustrates a platen with a platen object on top thereof wherein a region of the platen is illuminated from below by a collection of light rays;

DETAILED DESCRIPTION

Figure 3A:
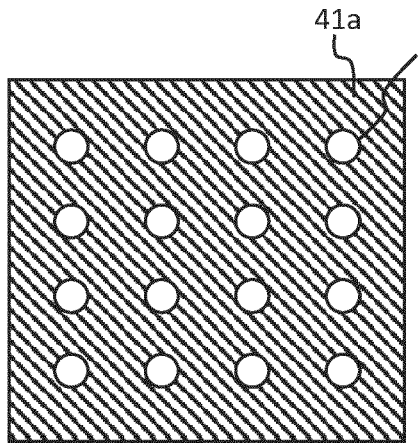
FIGS. 3a-f schematically illustrate examples of spatial patterning of light at a platen.

According to some embodiments, a presentation attack detection (PAD) system may provide a fingerprint sensing device that has a platen that may be substantially transmissive to certain optical wavelengths.

According to some embodiments, a PAD system may provide a first illumination module capable of illuminating the platen with spatially patterned illumination. The first illumination module may be capable of illuminating some areas of the platen with light while not illuminating or very dimly illuminating other areas of the platen. The first illumination module may emit light (e.g., visible and/or non-visible light) of wavelengths that the platen of the fingerprint sensing device may be transmissive to. The first illumination module may be a collection of illumination modules that illuminate the platen from different regions within the fingerprint sensing device housing at one or more of different sets of wavelengths, polarization states, optical power, and/or spatially varying patterns.

According to some embodiments, a PAD system may provide a first optical imaging module whereby the interaction of the light from the first illumination module with the platen and an object that is touching the platen may be sensed. The first illumination module and the first optical imaging module may also be used to scan a fingerprint (e.g., for purposes of enrollment, verification, and/or identification). The first illumination module may be capable of illuminating the platen with substantially uniform illumination. The first imaging module may be capable of imaging a sufficient aperture of the platen (e.g., an aperture of the platen that may be sufficiently sized to capture the required fingerprint(s)). A first means of scanning fingerprints for the purposes of enrollment, verification, or identification may not utilize one or both of the first illumination module or the first optical imaging module. A second illumination module capable of providing uniform (or substantially uniform) illumination and/or a second optical imaging module may be used to capture the required fingerprint image. The PAD system may scan fingerprints with a sensing means that is not an optical sensing means and a second illumination module and second optical imaging module may not be required because the first means of imaging the fingerprint may be non-optical such as capacitive, conductive, pressure, thermal, radio frequency (RF), or ultrasonic sensing.

According to some embodiments, a PAD system may provide a means by which the light interacting with the platen surface may be analyzed to make a determination as to whether the object touching the platen is a fingerprint of a human finger or that of a fingerprint corresponding to a presentation attack (PA). For example, the PAD system may analyze optical images of the platen surface, for example in order to determine color absorption and/or diffusion properties of the object touching the platen. The analysis of the optical images of the platen surface may include an analysis of regions of the platen that are substantially illuminated versus those areas that are not substantially illuminated. The PAD system may examine these two types of platen illumination regions (e.g., a region that is substantially illuminated and a region that is not substantially illuminated) and may determine one or more of the peak, valley, contrast, average grayscale, spatial frequency content, entropy, energy, or other statistical measures of image texture data corresponding to these two types of platen illumination regions.

According to some embodiments, the PAD system may perform the PA analysis across different wavelengths of illumination. The PAD system may obtain wavelength-dependent illumination information, for example by having a first optical imaging module that is capable of discerning color information of an object. For example, the first optical imaging module may incorporate a color CMOS (complementary metal oxide semiconductor), a CCD (charge-coupled device), and/or a spectrometer or hyperspectral sensor. The first optical imaging module may be capable of monochrome imaging, such as the case of a module incorporating a monochrome CCD or CMOS sensor. In this case, in order to extract color data from the object touching the platen, the first illumination module may cycle through two or more sets of illumination wavelengths and the first optical imaging module may capture one or more images at each illumination wavelength set. Note that even with a first optical imaging sensor that is capable of discerning different colors of illumination from the first illumination module simultaneously, the system may still obtain multiple images (e.g., different images captured at different wavelength sets of illumination). By way of example, the first illumination module may project white light at the platen and the first optical imaging system may be able to detect red, green, and/or blue image data. The first illumination module may switch to one or more other wavelength sets, such as ultraviolet (UV), violet, orange, yellow, deep red, and/or near infrared (NIR), and separate images taken with the first optical imaging module may be captured for one or more of the new wavelength sets. The first optical imaging module may cause differently polarized light to emanate from the platen (e.g., in addition to and/or alternatively to causing different wavelengths of light to emanate from the platen). By way of example, the PAD system may analyze light polarized different from that of an initial polarization state emitted from the first illumination module in order to highlight light that entered into an object touching the platen, scattered, and reradiated towards the first optical imaging module.

According to some embodiments, the PAD system may cause an image to be captured (e.g., at red and/or NIR wavelengths) and may cause a second image to be captured at a wavelength that is different from (e.g., shorter than) the red wavelengths, for example green or blue wavelengths. An algorithm may analyze the areas of the platen that are lit and that are substantially dark for each wavelength set. Human flesh tends to be translucent at red and near infrared (NIR) wavelengths. Therefore, shining red or NIR light using a first illumination module at certain points where a human finger touches the platen may cause light to propagate and scatter within the skin and to exit certain other areas of the skin that are not illuminated or that are substantially not illuminated. However, for shorter illumination wavelengths, for example such as green and/or blue wavelengths, if the object touching the platen is real human flesh, very little transmission, scatter, and/or reradiating of light in areas not initially illuminated may occur. As described earlier, analysis of the polarization state of the light emanating from the platen may determine an amount of light that is scattered by the platen object. Therefore, by comparing the areas illuminated to those not illuminated at one or more wavelengths, the PAD system may sense the color of the object touching the platen and also the scatter and absorption properties of the object touching the platen.

According to some embodiments, the PAD system may determine a temporal sequence of images, wherein the platen may be illuminated by the same (or substantially the same) spatially varying light pattern, and may determine temporal changes in the amount of light that scatters in the areas of the platen that are not directly illuminated. By way of non-limiting example, temporal changes in a platen object may be due to temporal changes associated with the object itself (e.g., blood being pulsed in a live human finger). The absorption of light by blood changes based on oxygenation because of the variance in optical absorption between hemoglobin Hb and oxy-hemoglobin $HbO_2$, particularly at optical wavelengths in the 610 to 750 nm range (red to near IR). The PAD system may observe the cyclical oxygenation of flowing blood, for example by analyzing areas of the platen image that are not directly illuminated across a sequence of images. The sequence of images may span several heartbeat pulses in order to observe a cyclical optical data metric. Note that the PAD system may analyze a sequence of images spanning only a single heartbeat cycle or a partial heartbeat and may detect a change in light scatter into non-illuminated areas over time.

According to some embodiments, the PAD system may determine which area or areas of the platen to examine. The PAD system may analyze an image (e.g., an image of a fingerprint), may detect the fingerprint area or areas of interest (e.g., for PAD analysis), and may determine to illuminate and/or analyze (e.g., with a first illumination module) only that area or those areas. The first illumination module may or may not be capable of directing dynamic illumination spatial patterns (for example, patterns that change with the position of sensed fingerprint locations). The PAD system may direct fixed patterns and the analysis may be conducted at the fixed areas. By way of non-limiting example, a PAD system that includes a four-finger scanner may first image the platen, determine that there are four fingers touching the platen, determine where the fingertips of the four fingers are, direct a first illumination module to illuminate primarily those areas with spatially varying light, and/or cause a processor to execute a PAD algorithm on those areas determined to contain the fingertips of the four fingers. Such methodology is described in more detail in U.S. patent application Ser. No. 15/926,928 and is incorporated by reference here in full.

According to some embodiments, the PAD system may include a fingerprint scanner capable of scanning one or more fingerprints. The fingerprint scanner may incorporate a means by which the fingerprint present may be imaged. By way of example, the fingerprint sensing mechanism within the fingerprint scanner may be one based upon free-space optical imaging, contact optical imaging, ultrasound, heat, and/or electrical sensing.

According to some embodiments, the PAD system may include one or more fingerprint sensing systems that are based upon free-space imaging, including total internal reflection (TIR) systems, Fresnel reflection systems, and/or direct view illumination systems. In TIR systems, the finger to be scanned may be placed onto a transparent prism and light entering from one side of the prism may illuminate the platen and undergo total internal reflection. For example, where the skin does not contact the platen (for example at the fingerprint valleys), the light may exit an opposing facet of the prism and may be imaged with an objective lens onto a sensor, such as a sensor fabricated with CMOS (complementary metal oxide semiconductor) or CCD (charge-coupled device), where the platen may be flat or curved.

According to some embodiments, a fingerprint sensor of the PAD system may not include optics for imaging the fingerprint, but instead may capture an optical image of a fingerprint using near contact imaging methods, such as those used with fingerprint sensors built based upon thin-film transistor (TFT) technology. For example, a 2D fingerprint sensor may be based upon TFT technology that includes photosensitive regions and electronic switching elements at each pixel along with areas that are non-opaque. The non-opaque regions of each pixel of the sensor may enable light from a backlight to shine through the TFT sensor plane and at the platen surface. The transmitted light may strike an object that is placed on the platen (e.g., a finger) and then light reflecting/scattering off of the object may be detected by an array of light-sensitive sensor pixels that may be switched via transistors located at each pixel site. Because the finger is in close proximity to the sensor pixels, no imaging optics are used, thus the fingerprint scanner works based upon non-imaging contact.

According to some embodiments, a fingerprint sensor of the PAD system may image fingerprints based upon non-optical signals such as ultrasound or electrical signals. In a PAD system using such a fingerprint sensor, there may be room between the ultrasonic generator and the platen. This extra room (as well as, in some embodiments, an optically transmissive material), may allow the optical illumination and sensor of the PAD system to be incorporated into fingerprint scanners incorporating an ultrasonic sensing means.

According to some embodiments, a fingerprint sensor of the PAD system may image fingerprints based upon capacitance and/or thermal sensing. The fingerprint sensor may incorporate any means of sensing fingerprints provided the platen is transmissive to certain optical wavelengths and can be integrated with a means by which the interaction of light with an object touching the platen may be sensed.

According to some embodiments, the PAD system may include a first illumination module that may contain a light source, reticles, and/or optics in order to illuminate the platen with a 1D or 2D spatially varying illumination pattern. The light source may incorporate illumination technology that is compact and efficient (such as laser diodes, light-emitting diodes (LEDs), and/or organic light-emitting diodes (OLEDs)), though other light source technology such as fluorescent, filament, and/or plasma tubes may be used. A means of providing the patterned illumination may be achieved through the light source, such as in the case of LED or OLED arrays or through the use of a reticle or otherwise secondary means of patterning the light source. Examples include use of patterned chrome on glass slides or a transmissive liquid crystal (LC) array or liquid crystal on silicon (LCoS) array that is addressable and allows light to transmit or reflect or not. Optics may be used to relay the patterned light from the light source and reticle to the platen. Relay optics that include one or more of reflective, refractive, diffractive, Fresnel, and/or holographic optical elements may be used to relay the light to the surface. Particularly in the case of holographic optics, the actual holographic element may be used to take the light source and ensure that at the platen surface, the light source appears patterned. With the case of refractive optics, one example is a lens system that images the reticle onto the platen surface. An example PAD system with a diffractive element may include the element placed in front of a monochromatic (or substantially monochromatic) source, such as a laser diode, LED, and/or spectrally narrowed LED (e.g., through use of a narrowband spectral filter). The diffractive element, such as from RPC Photonics (Rochester, N.Y.) or HoloEye Photonics AG (Berlin, Germany), may be designed to produce a pattern (for example, 2D array of circles, 1D array of lines) of light at the platen.

According to some embodiments, the PAD system may include a platen such that the surface of the platen may have a coating that is patterned to create the patterned illumination desired. In this case, the first illumination module may produce patterned light for PAD analysis, but may also produce uniform illumination. By way of non-limiting example, the coating that is patterned at the platen may pass light with wavelengths shorter than 500 nm, but may block light with wavelengths greater than 500 nm. If a first illumination module emits blue light, the imaging system of the device may see a uniformly illuminated platen, while for green or red wavelengths, the imaging system may see a platen that is illuminated with spatially varying light, where the spatial variations may be created by the patterned coating. In addition to and/or in lieu of having the coating achieving patterned light through changes in wavelength of the illumination module, the coating may achieve such patterning of light through a design of the coating that is angular and/or polarization discriminating. By way of example, a coating may be used such that for a certain set of wavelengths, the coating is reflective for a first set of incident angles and transmissive for a second set of angles. In this case, the fingerprint sensor may image the fingerprint for the PAD system using a first illumination module located at one location within the fingerprint sensing apparatus and may achieve a first set of incident angles while using a second illumination module for the fingerprint sensor's primary purpose and located at a second location within the fingerprint sensing apparatus in order to achieve a second set of incident angles.

The term fingerprint as used herein includes the image that results from any apparatus capable of imaging ridge topology of human skin in general. The term fingerprint should not be read as being limited to only one finger or only the fingertip. In general, the present disclosure may be applied to any fingerprint scanning apparatus that is capable of scanning one or more fingers, which may include fingertips and/or entire fingers and/or thumbs as well as any apparatus that is capable of scanning sections of one or more hands (including, for example, palms and/or writer's palms as well as entire hands). The present disclosure also applies to any ridge topology apparatus capable of scanning any other portion of human skin, including, but not limited to, toe prints, feet prints, leg, and/or arm prints. It should also be noted that in examining the skin topology, the PAD system disclosed herein may be used to specifically analyze certain pigmentation issues of the skin, for example examining the scatter properties of tattoos, moles, scars, and/or other skin features. The technology may be used to examine whether or not these skin features are real or fake.

According to some embodiments, the PAD system may be used for enrollment, verification, and/or identification. According to some embodiments, the PAD system may be used for presentation attack detection.

The term platen as used herein refers to the location that the object to be scanned for a fingerprint topology is to be placed. The platen may be configured to be optically transparent, but otherwise may be made of any material, including air, as in the case for a non-contact fingerprint scanner. So, although the detailed description may describe or imply that the platen is a physical interface that an object, such as, for example, a finger, is placed on, the platen may be a location in space and/or an annulus of a certain shape (for example, a rectangle and/or oval) that the object may partially rest on, but the area of the object, for example, a fingerprint tip of a finger, may be suspended in air above the illumination and imaging module(s) of the PAD system. Note further that in the case of a non-contact fingerprint scanner, the platen may not be a single plane, but may represent a volume that is to be scanned for fingerprints (e.g., because the scanner is designed to accommodate a range of finger distances.

Referring to FIG. 1, an apparatus 10 for capturing one or more fingerprints of one or more fingers is illustrated. FIG. 1 depicts a fingerprint scanner as a schematic of an optical scanner operating based on bright-field illumination and using the principle of frustrated total internal reflection (FTIR) to capture and record the presented fingerprints. Other fingerprint imaging systems may be used in apparatus 10, by way of example, dark-field illumination, non-FTIR imaging, touchless optical scanning, ultrasonic detection, and/or capacitance/impedance sensing.

FIG. 1 illustrates a platen object 8 (e.g., a finger) whose fingerprint 9 is imaged optically by a fingerprint scanning apparatus 10. Within housing or enclosure 12, a secondary illumination module 13 may be used for sending light through one facet 14 of a prism 16 that may be substantially transparent at the wavelength of light source operation. Light (denoted by ray 18a) from the secondary illumination module 13 may strike platen 21 and reflected light (denoted as ray 18b) may then propagate through prism facet 11 and may be imaged by optical imaging module 28. Optical imaging module 28 may include an objective lens 20 (composed of one or more optical imaging elements 20a) that focuses the reflected light onto a detector 23 (e.g., a two-dimensional (2-D) sensor). In one or more embodiments, imaging module 28 may serve as both the imaging module for the purposes of PAD as well as the apparatus's primary purposes of capturing fingerprint images, namely fingerprint identification. The reflected light (one ray of which is represented by ray 18b) represents an image of the surface topology of the skin or the finger(s) presented to platen 21 at or about the fingertips as typical of fingerprints. Sensor 23, by way of example, may be a complementary metal-oxide semiconductor (CMOS) or charge-coupled device (CCD) sensor that is mounted to a circuit board 24 and connected, via power and communication cable 26a, to a main circuit board 25 of the apparatus 10. Each image captured may represent a two-dimensional array of pixels each having a gray scale value. The fingerprint scanning apparatus may be controlled by an external computer system 30 attached via communication and power cable 26c. Alternatively, computer system 30 may control the fingerprint scanning apparatus wirelessly or by being included within housing 12. Additional components known in the prior art other than those described above for capturing a fingerprint image may be included within housing 12 depending on the type of imaging system utilized in the apparatus, such as components and modules to enable dark-field illumination, non-FTIR imaging, touchless optical scanning, ultrasonic detection, or capacitance/impedance sensing. The platen 21 may be that of a typical optical fingerprint scanner or a fingerprint scanner employing other types of fingerprint imaging (e.g., capacitance sensing), but still capable of capturing a digital image of the subject's fingerprints.

The main circuit board 25 may contain electronics having one or more processors 27 that allow it send one or more control signals to control sensor 23, via cable 26a, and the illumination source 13, via cable 26b, as well as performing image processing, if needed, of the image captured and received from sensor 23 of the one or more fingerprint(s) as typical of a fingerprint scanner. The apparatus 10 may be coupled by power and communication cable 26c or wirelessly to computer system 30 or other microprocessor-based system having processor(s) for processing of images captured by apparatus 10 received from processor(s) 27, and/or such processing may be carried out by processor(s) 27 in housing 12. The computer system 30 and/or processor(s) 27 may store fingerprint images segmented from images captured by apparatus 10 in memory (e.g., memory on board 25 accessible to processor(s) 27 and/or computer system 30) to store the electronic equivalent of a Type-14 record for subjects.

The processor(s) 27 may operate in accordance with software (program instructions) in memory, such as on board 25, or in processor(s) 27 for enabling image capture and storage, and image processing as typical of a fingerprint scanner with the improvement of being able to determine if the object present at platen 21 is a bona fide human presentation or an imposter.

Embodiments of the present disclosure improve upon the prior art, for example by incorporation of a first illumination module 17 (in addition to other improvements disclosed herein). Module 17 mounted at facet 15 of prism 16 may be capable of projecting light, denoted by rays 19a and 19b such that scattered light (not drawn in FIG. 1) from an object touching platen 21 may re-enter the prism, propagate at substantially the same angle as ray 18b, and be imaged by sensor 23. The prior art has examples of illumination modules that are placed below the platen 21, such as the one depicted in FIG. 1 for the case of dark-field illumination TIR optical fingerprint scanners. What makes illumination module 17 novel is that either by itself or in conjunction with an optional coating 22, the illumination from this module once it hits an object on platen 21 will be spatially patterned. Based upon how this patterned illumination interacts with the object on platen 21 and detected by sensor 23, dictates how an algorithm stored within housing 12, in computer system 30 or in a separate computer system, not drawn, that post analyzes the data collected by apparatus 10 determines if the object touching platen 21 is of a bona fide human presentation or from an imposter. Note that module 17 may be attached to other facets of prism 16 such as facets 11 or 14 and function similarly.

In one embodiment, illumination module projects patterned illumination itself and does not require coating 22. In this embodiment, illumination module may be constructed as illustrated in FIG. 2 wherein an optical imaging system 31 is used to image light rays 35 from patterned object 32 onto platen 21, where light from optical imaging system 31 comprises light rays 36. Optical imaging system 31 may consist of one or more refractive lenses, reflective lenses and diffractive or holographic lenses. Patterned object 32 is generally defined as an object with spatially varying differences in optical transmission or reflection. To achieve said differences, a substrate material can be cut or coated with other materials in order to vary the reflection or transmission of the patterned object. Examples of patterned objects include patterned chrome on glass slides or patterned printed paper. Alternatively, patterned object 32 may be a wire-EDM (electrical discharge machining), stamped, or lithographically through etched metal sheet. Patterned object 32 may also be screen-printed or lithographically patterned with die or other coatings to achieve the desired spatially varying pattern. If the resulting patterned object 32 is designed to have areas of varying optical transmission, then light source 33 may be placed behind object 32. If the patterned object 32 is designed to have regions of varying reflection, then one skilled in the art realizes that light source 33 in FIG. 2 should instead be placed in front of said object such that reflected light pattern can be imaged with optical imaging system 31.

Though the previous examples of how patterned object 32 may be constructed result in a static pattern, it is preferential that illumination module 17 can dynamically change the resulting light pattern at platen 21. This can be achieved by using several static patterned objects that can be selectively moved (rotated and/or translated) in the focal plane of optical image system 37. By way of non-limiting example, patterned object 32 may be one of several patterned objects (one additional patterned object being drawn and labelled as 32*a*) that are attached to a rotary stage 38 that rotates around axis 38. Processors 27 via cable 26*d* can then direct rotary stage 38 to clock in a specific patterned object depending upon what pattern is preferred as a function of where fingers or finger-like object are present on platen 21. A similar functionality may be achieved if stage 38 is a linear stage and the patterned objects 32 and 32*a* are aligned linearly and may be moved linearly to select which particular patterned object will be imaged by optical image system 31 onto platen 21. In an embodiment, patterned object 32 is not static, but an active element such as a pixelated liquid crystal array. This liquid crystal array can be used to dynamically change the spatial transmission (for example liquid crystal on a glass backplane) or the spatial reflection (for example liquid crystal on silicon or LCoS arrays) pattern of the patterned object. In another active patterned object embodiment, an organic light emitting diode (OLED) pixelated array may be used and in which case patterned object 32 and light source 33 are combined. Note that the pixilation of the liquid crystal, OLED, or other dynamically addressed patterned object known to one skilled in the art need not have 2D x-y grid. Pixelation may be any other form of array (for example, hex or triangular) and/or may have pixels that are shapes such as lines, circles, or other shapes advantageous in the PAD analysis. In lieu of a patterned object or in conjunction with, a scanning light beam may be used. For example, in order to create multiple spots on the platen of illuminated and non-illuminated areas to analyze, one or more galvanometer mirrors may be used to position an optical illumination pattern on the platen. This optical pattern may be swept or its position moved multiple times with an image of each new location taken. A digital light projector (DLP) may be used to project a spatially varying illumination onto the platen where now the patterned object 32 being imaged is an addressable array of micromirrors (MEMS mirrors) that is illuminated by a light source 33.

Figure 3B:
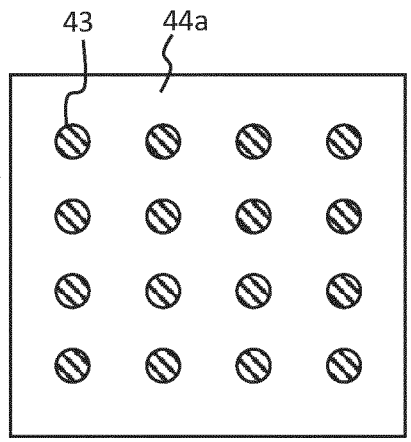
Figure 3C:
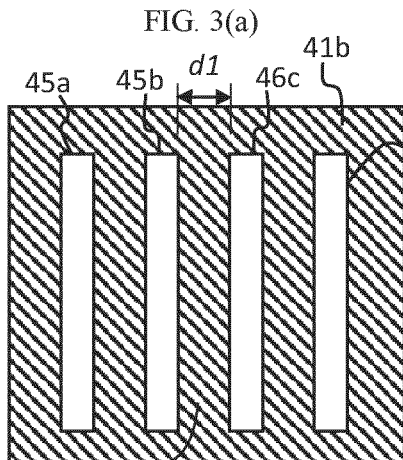
Figure 3D:
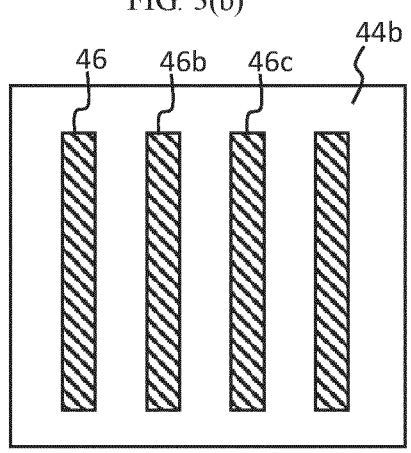
Figure 3E:
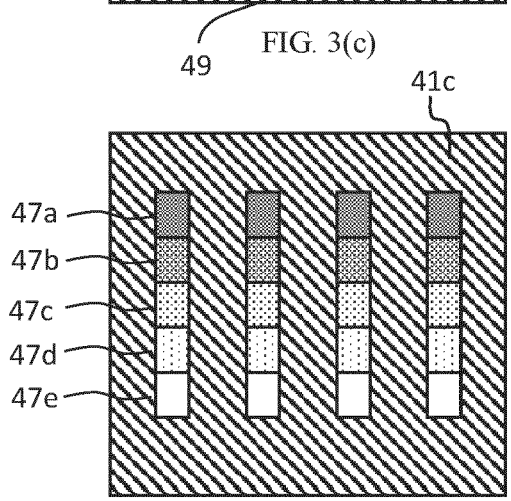
Figure 3F:
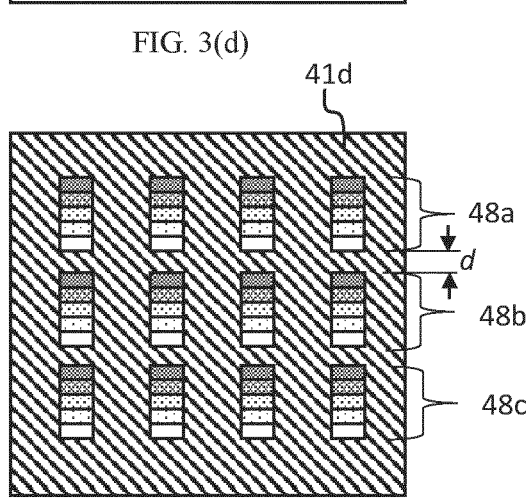

The spatial patterning of the light at platen 21 may take many forms, examples of which are illustrated in FIGS. 3*a-f*. The diagonally hashed areas of FIGS. 3*a-f* illustrate areas of the platen that have little light, while white areas have the most light. The dotted areas of FIGS. 3*a-f* illustrate areas of the platen that are exposed to light levels in between those of the diagonal hashed and white areas, with the denser the dot pattern, the less light exposing that particular platen area. As illustrated in FIG. 3*a*, the illumination pattern may be a 2D array of illuminated areas with the example of a 2D array of illuminated circles 42 on a dark background 41*a*. Ovals, squares, rectangles, triangles, or other shapes may be used in lieu of circles. The inverse pattern may also be used where an array of dimly illuminated areas 43 on a light background 44*a* may be used, as depicted in FIG. 3*b*. FIGS. 3*c* and 3*d* illustrate how the pattern may be a 1D array of illuminated linear areas 45 on a dark background 41*b* or dark linear areas 46 on a light background 44*b*, respectively. In FIG. 3*e*, it is illustrated that the areas that are illuminated on the platen need not be illuminated to the same intensity level. Instead, different areas of the platen (tagged as 47*a* through *e*) may be illuminated with different amounts of light. Note that the columnar stepped intensity pattern of FIG. 3*e* may be arrayed in a 2D pattern, as illustrated in FIG. 3*f*. The separation between columnar stepped light intensity patterns, for example 48*a* and 48*b*, may be separated by a distance d where d could equal zero. In lieu of discrete changes in grayscale illumination of platen 21 as illustrated in FIGS. 3*e* and 3*f*, the columnar stepped light intensity patterns may be grayscale illumination that is continuously changing (gradient) with a light intensity patterned that is ramped, sinusoidal, or any other variation of light intensity in one axis. Patterned objects 32 that can achieve such gradients can be fabricated using photo paper, film, or chrome (chromium) on glass.

Light source 33 contains wavelengths that imaging module 28 can create images from but should also contain specific wavelengths that are preferred when performing presentation attack detection (PAD) analysis. Light source 33 may be a compact, power-efficient light source such as an LED or OLED but may also be other light sources known to one skilled in the art such as those utilizing filament or fluorescent illumination technology. An image of the platen may be able to be taken at different wavelength bands, for example red, green, and blue or red, green, and ultraviolet, or green and near infrared. As discussed earlier, this can be achieved where the light source 33 is a broadband or multi-wavelength band source and sensor 23 has a color filter array aligned to its pixel array as in the case of a color CMOS or color CCD. Note that in referring to a color CMOS or color CCD we are not restricting the color patterning to be that of the common Bayer RGB color filters. Alternative color filter patterns and alternative color filter spectral transmission sets may be used. For example, a CMOS sensor may be used as sensor 23 to determine the red, green, blue, and near infrared color attributes of platen object 8 (which may or may not be a finger). Custom pixelated color filter arrays may be created for other bands of wavelengths such as ultraviolet, violet, orange, yellow, or different NIR wavelength bands and added to sensor 23. Alternatively color filters can be added at other locations in the optical system in between the light source 33 and the sensor 23 and these color filters may be electrochromic (for example those fabricated using crossed polarizers and electro-optical or liquid crystal material) or may comprise of several filters that are mechanically moved in and out of the optical path (similar to how the movement and placement of multiple patterned objects using rotary and linear motors was described earlier) in order to sample the desired band or set of wavelengths.

As an alternative or in addition, the color information of the platen object 8 is obtained by having successive optical images of the platen taken with different color illumination coming from light source 33. As mentioned earlier, light source 33 can be an array of LEDs and specifically may be an array of RGB LEDs that may be individually addressable. RGB LEDs are LED packages where 3 LED dies (one red, one green, and one blue) are integrated into a single package and are addressable so that one or more of these individual LEDs may be turned on at a different optical power level. If the array is addressable, then patterned object 32 may not be required since the individual LEDs can serve as the pattern to image onto platen 21. Note that one skilled in the art can create alternative packaged LEDs that need not be RGB but could be any combination of UV, visible, and NIR LEDs. Alternatively, other light sources combined with a patterned substrate known to one skilled in the art include a liquid crystal display (LCD) with a backlight where the LCD can be designed to select certain wavelengths of the backlight 33 (as most computer monitors do currently) as well as OLED displays.

As referred to earlier, the patterning of light at the platen surface may be achieved with the use of coating 22, where coating 22 is spatially patterned. First illumination module may be constructed similarly to what is shown in FIG. 2 and use coating 22. However, a simpler construction is to eliminate patterned object 32 as the coating 22 is spatially patterned. In its simplest construction first illumination module 33 consists of a light source 33 that is a single LED with an integrated lens with performance such that coating 22 is uniformly illuminated. Coating 22 is then fabricated such that the coating transmission varies as a function of position across the platen. In one example, coating 22 has uniform transmission for the light that illuminates from secondary illumination module 13, but a patterned transmission for light from first illumination module 17. One example of such a coating is to coat stripes of a coating design onto prism 16 (or an intermediate glass sheet that is later bonded to the prism), wherein the transmission of the coating for the angle, wavelength band, and polarization of the light from second illumination module 13 is same as that for a bare prism material interface. However, for the particular angle, wavelength band, and polarization of the light coming from first illumination module, the transmission is different from that of a bare prism material interface. Such coatings can be designed by most optical coating houses, though patterning of the coating is a bit more specialized skill.

According to some embodiments, the PAD system may be able to measure not only the color properties of the platen object 8, but to also be able to measure metrics that are dependent upon the transmission, absorption, and scatter properties of the object 8 in order to determine if the platen object is likely a human finger or likely a fingerprint presentation attack. It is for this reason, that in the description of the apparatus 10 of FIG. 1, platen 21 may be illuminated with a spatial varying pattern of light. To clarify why platen illumination patterns wherein there are regions of no or little illumination and regions of bright illumination are advantageous for PAD algorithms, consider the diagram in FIG. 4. In FIG. 4 we illustrate platen 21 with a platen object 8 on top of it and a region 21a of platen 21 that is illuminated from below by a collection of light rays bound by rays 37a and 37b. Now consider light ray 38a that illuminates region 21a. Some of the light is immediately reflected or scattered at an angle θ (or close to said angle) relative to surface normal 39 of platen 21. The angle θ is significant as this is the center angle of the field of view of the apparatus' imaging module. The rest of the energy contained in light ray 38a will enter object 8 and in general scatter multiple times (such as represented by light rays 38c, 38d, and 38e) until finally the light scatters as ray 38f and leaves platen object 8 at a platen location 21b that is not directly illuminated and in a direction of θ or close to it so that it too can be imaged by the apparatus' imaging module. The transmission, absorption, and scatter properties of the material contained within platen object 8 as a function of the wavelength or wavelength band of the light ray 38a dictates how much light such as ray 38f will emerge from the platen object a distance di. For materials with high absorption, for example paper, the amount of optical energy imaged outside of the illuminated area 21a will be very small, while for skin at least at red or NIR wavelengths, there is low absorption and high scatter, thereby resulting in significantly more light that emerges in the non-illuminated areas 21b. Note that although only a single illuminated area 21a is drawn in FIG. 4, there is in general a plurality of illuminated areas such as the examples given in FIG. 3.

Figure 5:
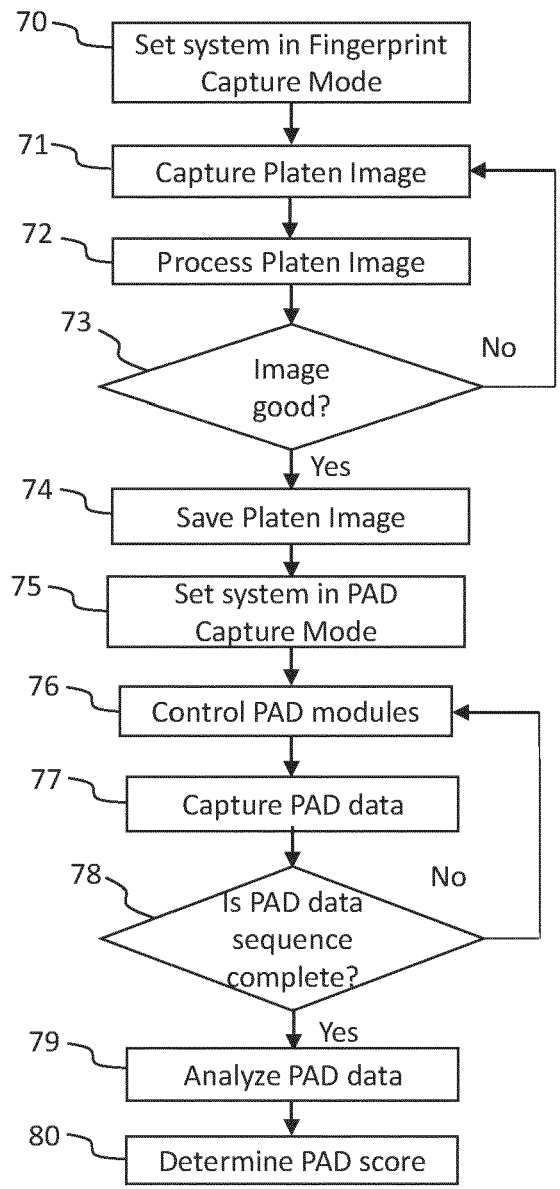
FIG. 5 is a flow diagram of an example process for an example PAD system.

FIG. 5 depicts a flow diagram of an illustrative process for an illustrative PAD system, in accordance with one or more embodiments of the disclosure. The apparatus is first set, Step 70, into a mode to capture a fingerprint image for identification using the imaging technology the apparatus is designed for, which by way of example, may be optical, capacitive, thermal, RF, or ultrasonic. Depending upon the imaging technology in play, the apparatus may power up a generator or illuminator of some sort (for instance to project optical, RF, or ultrasonic waves towards the platen) and power up a sensor to read the signal types that the apparatus is designed for performing identification with. In Step 71, an image of the platen is captured. The image is then optionally, but preferentially processed, Step 72, to determine metrics such as the number of fingers on the platen, the orientation of the fingers on the platen, the location of the fingertips, and quality of the fingerprints. Determining these metrics may be performed with firmware or software code contained within the housing of the apparatus and executed by its one or more processors or performed by a host computer based upon images passed from the apparatus. The software or firmware may have one or more thresholds or similar means of determining, Step 73, whether or not the collected image meets the criteria of a good image. By way of example, a good-image criterion might include one or more of the following metrics: number of fingers (or blob images) detected on the platen, area of the fingers or blobs in the image, number of minutiae detected within fingerprint region, and contrast of fingerprint region. If the scores for each of the metrics are above a threshold, continue to Step 74, and if not, return to Step 71 and capture a new platen image. At Step 74, the image determined to be good enough quality for fingerprint identification per Step 73 is saved (such as in RAM, in flash memory, solid state drive, or a hard drive). At Step 75, the system is set into PAD capture mode, so that the system is ready to capture data needed for PAD analysis. This may or may not involve turning off the illumination and imaging modules that were activated as part of Step 70 when the apparatus was set into fingerprint capture mode. The PAD capture mode will involve setting the PAD modules in a mode (electronic control or mechanically aligning modules or submodules) to be ready to project the required light at the platen and to be ready to image the platen. A PAD module is any module required to capture a PAD image and includes the first illumination module and the first imaging module. At Step 76, the PAD modules are controlled to be ready to capture data. This control may include one or more of the process of turning on light source 33, selecting patterned object 32, and turning on a first imaging module. In terms of selecting patterned object 32, the pattern of the patterned object may be a routine standard pattern or sequence of patterns. Alternatively, or in conjunction with, the image collected at Step 71 may be analyzed in a step prior to Step 74 wherein the location of the areas of the image to be analyzed for a presentation attack are calculated. By way of example, a single-finger fingerprint scanner may find the centroid of the fingerprint blob and determine that is the ideal spot to light with illumination for PAD analysis. In another example, a four-finger fingerprint scanning system identifies the locations of the four fingers in the image, identifies the fingertips of each of the four fingers, and then further identifies the centroid of the fingerprint tips and the direction of the fingerprint and thereby determines the line segment along which to illuminate for the purposes of PAD analysis. The fingerprint image analysis that takes place prior to activation of the PAD modules may dictate what type of patterned object to select, whether or not it is a static patterned object 33 that may be selected from a set of patterned objects and moved in place via mechanical means 37, or it is an active patterned object such as in the case of an LCD or a LED or OLED display or array. At Step 77, PAD data is captured. If a single PAD data sequence is all that is required, the system will begin analyzing the PAD data at Step 79, otherwise with the loop decision step of Step 78, the system will continue to loop back to Step 76 until all required PAD images are captured. Note that looping back to take additional data that is part of the PAD data sequence, the PAD modules may be controlled or adjusted again in Step 76. Adjustment of the PAD modules may include, but not limited to, changing optical brightness, wavelength or polarization of light source 33, changing the pattern of patterned object 33 either by electronic means (as in the case of an OLED or LCD), or mechanical means (for example swapping patterned object 32a for patterned object 32 via a mechanical stage 37), changing the gain, integration time, gamma or other sensor 23 parameters of the first imaging module, moving first illumination module or first imaging module to another position, or activating other first illumination modules or other first imaging modules. Alternatively, or in addition to, no PAD modules are adjusted and a new PAD image is captured without changing module parameters, such as for the example of having multiple same-setting images for the purpose of image averaging to achieve sensor temporal noise reduction. Once all PAD data in the desired sequence are captured, the system analyzes the PAD data with appropriate code in firmware and/or software, Step 79.

As a first step in the analysis, the PAD data which will in general include images of the platen object may be analyzed for movement. This is particularly important if multiple images are taken as part of a PAD sequence and comparison between images is required. This analysis for platen object movement may be performed with just the PAD sequence data, with the fingerprint platen image captured in Step 71 and saved in Step 74 and with a fingerprint platen image captured in a repeat of Step 71 through 74 performed after Step 78 (not drawn), or a combination of the two. Methods of determining platen object movement can include numerous algorithms known by one skilled in the art such as thresholding a sum of the absolute value pixel-to-pixel grayscale difference between two or more images. A variant of this algorithm is to perform same sum of the absolute difference but with platen images that have been first processed with a Gaussian convolution of the image to smooth the image data and any temporal noise differences between the images before pixel grayscale subtraction takes place. If movement of the platen object is detected, the algorithms run by the system may be intelligent enough to correct for movement, for example, finding features in the second or more image data collected that are same and shift the additional images in x, y, and/or θ (rotation) to match the first platen object image data. Alternatively, the detection of movement may require that the process flow commences again at Step 75 or back to Step 70 to recapture image data that will be checked for motion and only once no movement or at least acceptable levels of platen object movement has occurred will the system move to Step 79 to analyze the PAD data.

Analysis of the PAD data in Step 79 may entail analysis of the color of the fingerprint images as performed in the prior art, but preferentially analyzes metrics associated with the wavelength-dependent absorption and scatter of the platen object. As discussed earlier, and particularly in reference to FIG. 4, the advantage of illuminating platen 21 with one or more sets of lit and dark areas is in order to detect the amount of light that transmits into the material of platen object 8, scatters, and reemerges at platen areas that are not illuminated. Therefore, it may be advantageous to analyze the image grayscale of the non-lit areas of the image to determine their peak, valley, average, and contrast and compare these to those metrics of the lit areas of the platen. One skilled in the art will recognize other metrics to analyze such as the energy, entropy, and correlation. In analyzing the images, it may be preferential if pixel defects and/or sensor noise are removed and/or accounted for in the image. Further it may be desirable if analysis of the unlit regions is done at several distances from the lit regions in order to determine how quickly the scattered light is decaying in intensity. Depending upon the resolution gray levels of the sensor (e.g., 8 bit, 10 bit, 12 bit), the sensor may or may not have the grayscale resolution in order to measure this falloff in intensity across the full range of bona fide (human) presentations and imposter presentations. A solution for this is to capture multiple images of the same illumination spatial pattern, but at different light intensities and/or camera sensitivity settings (e.g., gain and/or integration time). In lieu of taking multiple images or in conjunction, the light intensity pattern illustrated in FIGS. 3e and 3f may be used where there are several lit areas on the platen, but of different light intensity. Using light patterns of varying intensity, the highest brightness illumination (tag 47e) can be used to measure the intensity of the scattered light furthest (to the left or right) from this area. The next highest illuminated area (tag 47d) may be used to measure the intensity of the light that is slightly closer to this illuminated area and so forth. In some embodiments, it may be preferred that the illuminated areas are not saturated, while the sensor and therefore the image still has the grayscale dynamic range to measure light intensity of the scattered light as far away from these illuminated areas as possible. In this manner, a ratio of metrics measured in the illuminated areas to the non-illuminated can be made. Such ratios may be beneficial in order for the measurements to be invariant to differences in light intensity of light source 33 as a function of time or from apparatus to apparatus. Such ratios may also be beneficial when performing PAD analysis across a range of skin pigmentation, for example to help factor out the absorption of skin pigmentation at the surface of the skin. However, if there is saturation of area of the platen with the brightest amount of illumination from the first illumination module, the gradient or stepped illumination patterns, examples of which are shown in FIGS. 3e and 3f may be advantageous. Each illuminated block 47a through 47e may be saturated in the platen image, however, since they represent different amounts of light illuminating the platen, the scatter of light by the platen object to the left and to the right of each of these illuminated blocks will have different intensity. By measuring at what distance away from the blocks the grayscale image stops being saturated also gives information about the scatter properties of the platen object.

Note that when having multiple spots, care should be taken regarding the scattered light crosstalk. For example, the separation of illuminated lines 45a through 45d in FIG. 3c may dictate how sensitive the scattered light can be measured. For example, in the captured optical image at a location that corresponds to non-illuminated area 49, the grayscale may be a sum of light scattered from platen object that originated in platen areas corresponding to illuminated lines 45b and 45c. This combining of scattered light from two separated illuminated areas is what is referred to as crosstalk. Depending upon the scattering profile of platen objects of interest, the dynamic range and sensitivity of the imaging system, and the PAD algorithm implemented, the separation di may be chosen.

Once metrics are extracted from the fingerprint images, a PAD score may be calculated, Step 80, that can be reported. In some embodiments, a convention may be established that the PAD score ranges from 0 to 1 inclusive and that low scores are an indication of a bona fide presentation, while scores on the high side are indicative that a presentation attack took place. Note that other conventions may also be used. A set of bona fide presentation images may be collected and the values of N metrics for each image may be calculated. As discussed earlier, these metrics may be calculations based upon the statistical analysis of the grayscale of the lit and non-lit areas of the platen image as a function of illumination wavelength, polarization, illumination intensity, and distance of the non-lit areas from the lit areas. Using the metric values as coordinate values, a point for each analyzed image may be plotted in N-dimensional space where N is the number of metrics calculated for each point. Plotting all points for the set of bona fide presentation images collected results in an N-dimensional blob of points, within which defines bona fide presentations and, in some embodiments, outside of which are imposter presentations.

One method of defining a PAD score is to first calculate the average, and the standard deviation, $\sigma_i$, of the $i^{th}$ metric. The PAD score for the $i^{th}$ metric alone may be written as $$PAD_i = 1 - \exp[-((m_{i,j} - \mu_i)/(\alpha_i \cdot \sigma_i))^2],$$

which will vary from 0 to 1 where $\exp(x)=e^x$, $m_{i,j}$ is the $i^{th}$ metric calculation for the $j^{th}$ image, and $\alpha_i$ is a scaling factor that can be set for each metric in order to include more or less of the tail of the bona fide distribution calculated. One example of a fused PAD score that will also vary from 0 to 1 is a weighted average of the collection of PAD scores for each metric where the weighting may be determined by a confidence level of the metric. Confidence levels may be determined by the noise level of the imagery used to calculate the metrics as well as from empirical evidence regarding which metrics may be more likely to be discriminative of a bona fide versus an imposter presentation.

As an alternative to the handcrafted PAD algorithm approach previously mentioned, a machine learning approach may be used. In one example, the PAD images collected with their ground truth (meaning knowing whether or not the images were taken from a bona fide presentation or an imposter presentation) can be used to design and train a neural network or other machine learning algorithm in order to create a PAD algorithm. Alternatively, the machine learning architecture may be built and trained around not the raw images but processed images and/or the metrics or features extracted from these images, where said features or metrics may be some of the ones cited earlier with regards to the solely handcrafter PAD algorithm approach.

Note that for the PAD analysis of Step 79, information gathered in a prior step, in some embodiments prior to Step 74 regarding the preferred image areas to analyze may be utilized. As cited earlier, the system may calculate these preferred areas in order to determine the proper settings when activating the PAD modules. Further, even if patterned object 32 is not changed based upon the fingerprint location identified on the platen, the fingerprint location analysis discussed earlier may define the region of interest in the PAD image that PAD analysis is performed. By way of example, based upon where the centroids of the fingerprint tips are located, the system may choose the illuminated and non-illuminated areas that best overlap with the desired skin topology areas to analyze, in this particular example, the fingerprint tips.

Figure 6:
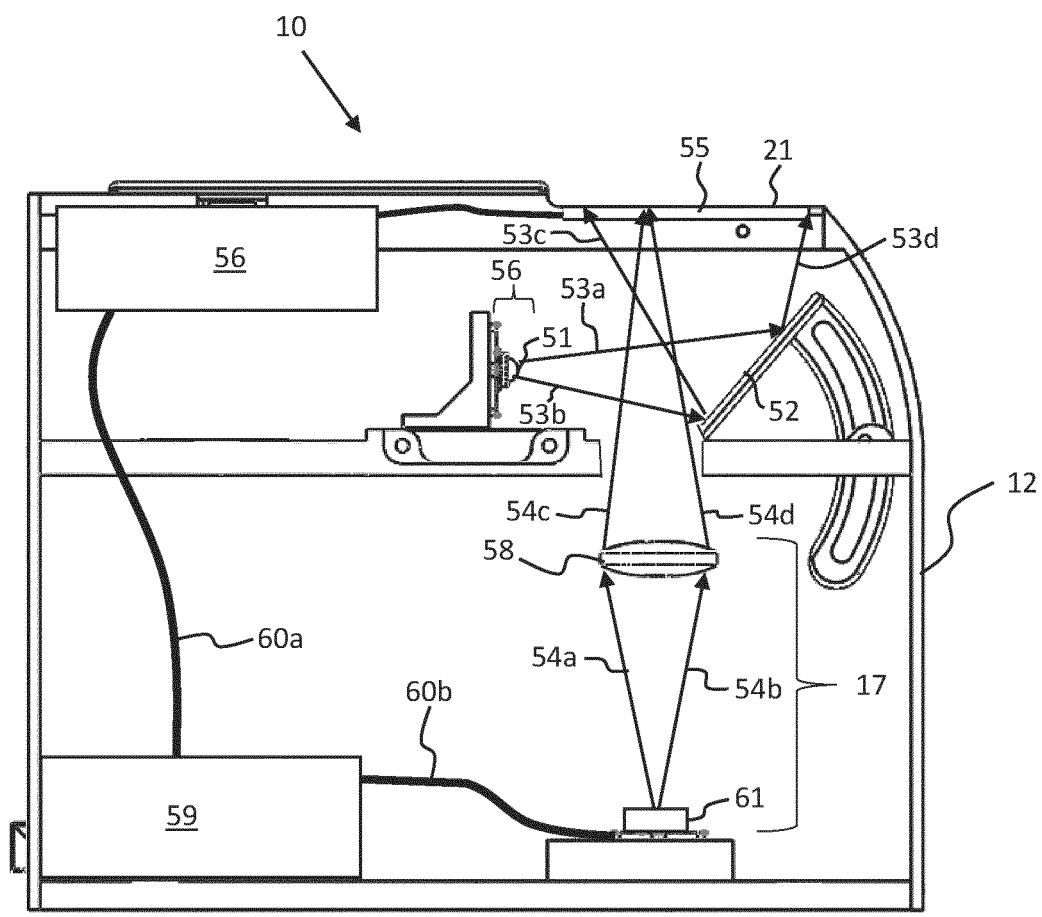
FIG. 6 schematically illustrates an example PAD system.

FIG. 6 depicts an example PAD system, in accordance with one or more embodiments of the disclosure. The example PAD system includes an apparatus 10 that has a housing 12 within which is contained a thin-film transistor (TFT) fingerprint sensor 55. As drawn, fingerprint sensor 55 is optically sensitive and images fingerprints of objects touching platen 21 through the incorporation of illumination module 56 (e.g., a second illumination module). However, as described earlier such a TFT fingerprint sensor can incorporate an array of sensitive areas that are sensitive to light or electrical (such as capacitance) signals, or both. Regardless of what signals the TFT sensitive areas are designed to be sensitive to, the PAD system may include one or more transparent areas through which light from illumination module 17 (first illumination module) can transmit and reach platen 21. As drawn, the apparatus 10 of FIG. 6 images fingerprints based upon optical signals. A second illumination module 56 that incorporates a lensed LED 51 is used to project light rays 53a and 53b towards a mirror 52 that reflects the light rays (for example, 53c and 53d) towards the TFT sensor 55 for purposes of fingerprint identification. The transparent areas of TFT sensor 55 allow the reflected light rays to reach platen 21. In some embodiments, illumination module 56 may have the required optics (such as diffusers, microlenses, and lenses) and illumination sources (such as LEDs) to achieve a relatively uniform illumination at platen 21. It is this illumination that is used by apparatus 10 in order to capture the fingerprint or fingerprint(s) of one or more fingers. For the data required for the PAD algorithm, first illumination module 17 is incorporated. As drawn in FIG. 6, first illumination module consists of a light source 61 and a lens 58. The light source 61 may incorporate a patterned object and various light emitting technology as discussed in reference to first illumination module 17 in FIG. 3. For a single-finger fingerprint scanner where one is relatively assured that the fingerprint will be centered on the platen and take up most of the platen area, a static illumination pattern may be sufficient, and light source 61 may be just a bare LED where the LED die of the illumination package is imaged with a magnification that may or may not be 1:1 onto platen 21. Alternatively, the LED may be lensed to help collect the light and then be imaged by lens 58. Although drawn as a single lens, one skilled in the art will realize that lens 58 may be substituted with any imaging system that performs the function of imaging light source 61 to platen 21. Additionally, lens 58 may be substituted with a non-imaging system that does not image light source 61, but rather, projects its light onto platen 21 such that the desired spatially varying illumination pattern is achieved. Non-imaging optics are commonly used in headlamps of automotives to project headlights onto the road with a specific light distribution. Light source 61 is preferentially turned on at a different time as when illumination module 56 is.

Figure 7:
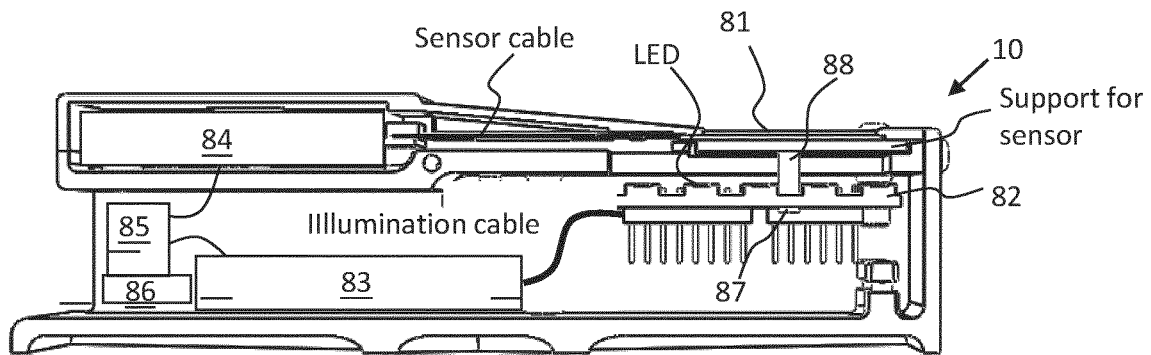
FIG. 7 schematically illustrates an example compact fingerprint scanning apparatus, conducive to mobile or handheld applications.

According to some embodiments, as illustrated in FIG. 7, the fingerprint scanning apparatus 10 incorporating one or more embodiments of the current disclosure may be more compact and conducive to mobile or handheld applications. In this embodiment a TFT fingerprint sensor 81 is incorporated into a housing that contains an LED array 82 as a second illumination module used during fingerprint identification. The TFT sensor array is optically sensitive, but need not be as discussed earlier and could be capacitive, in which case, LED array 82 is not required. The second illumination module is connected to an illumination controller 83, and TFT sensor 81 is connected to a sensor controller 84, both of which are controlled by one or more processor(s) 85. The power for the device, since it can be mobile or handheld, is from an internal battery 86. For purposes of PAD data acquisition, an additional LED 87 is mounted within LED array 82, the light from which is collected and brought to the platen via use of a light pipe 88. Additional LED 87 may be mounted at the same level as the other LEDs that uniformly illuminate the platen, or may alternatively be mounted before LED array 82 and a through hole in LED array 82 may be present. Light pipe 88 may have a circular or other cross section and may be made of a material transparent to the PAD wavelength of operation. For example, it could be made of glass or an optically clear plastic, such as acrylic. Additional LED 87 need not be a single LED, but may be a collection of LEDs. By way of example, additional LED 87 may be an RGB LED, wherein three LED dies (one emitting red, one green, one blue) are integrated into a single package. In this manner, a spot illumination may be made on the platen with one of the three different wavelengths the RGB LED is capable of emitting. Although one additional LED and light pipe are illustrated, in general, multiple LEDs and light pipes may be used, or a single additional LED used and a light pipe or similar non-imaging relay optic(s) brings the additional LED light to multiple locations on the platen.

Figure 9:
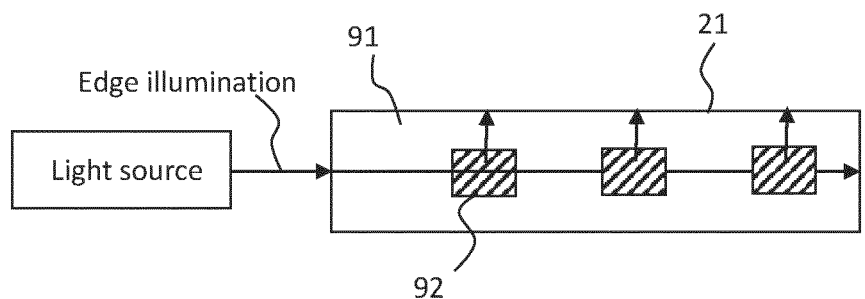
FIG. 9 illustrates a lightguide with one or more structured areas that direct light up towards a platen.

A schematic of an alternate embodiment demonstrating how platen 21 may be illuminated with a spatially varying light pattern is illustrated in FIG. 9. In certain areas of lightguide 91, one or more structured areas 92 directs light up towards the platen. Although drawn as light going straight up, this is not a restriction of the embodiment and it could in general go up towards the platen at an angle. The directing of light by structured areas 92 towards platen 21 in select areas can be accomplished using partially reflective mirrors, holograms, diffractive elements, as well as ground or rough areas of material. The structured areas 92 that direct light up towards platen 21 may even be electronically switchable, such as is the case, for example, of sandwiched liquid crystals over a grating structure. The regions of lightguide 91 that deviate the edge-illuminated light are designed such that they produce the desired spatially varying illumination pattern at platen 21, which for light coming from a single direction, implies that each region of the deflecting structured areas 92 of lightguide 91 may not be designed identically. Note that although light is illustrated coming from one side of lightguide 91, this is not a restriction of the present disclosure as similar in function lightguides may be designed by one skilled in the art for edge-illuminating light coming from multiple directions. Lightguide 91 may be designed such that it does not interfere with the normal operation of the scanner for identifying fingerprints. If the scanner performs fingerprint identification optically, then a Bragg hologram has the advantage that for the angle, wavelength, and polarization of the edge-illuminating light, that light may be directed by the hologram. However, other illumination light the scanner may use for platen 21 illumination for fingerprint identification is relatively unaffected because of a difference in one of more of angle, wavelength, and polarization. Alternatively, lightguide 91 for the optical fingerprint scanner may include one or more partially reflective mirrors where the mirror coatings are such that they deflect the edge-illuminating light appropriately but have minimal effect on the scanner illumination used when identifying fingerprints. For example, the edge-illuminated light used for PAD analysis might consist of red and green colored wavelength, while the fingerprint scanner operates normally at blue wavelengths, in which case the mirrors may have a dichroic coating that reflects light with wavelengths longer than 500 nm and transmits wavelengths below 500 nm.

UV and NIR wavelengths may be advantageous because the human eye has a low photopic response. Because light must penetrate the platen object, light must escape the platen and therefore there may be a risk of light going into subject's eyes and being distracting. Using UV or NIR light may be much less distracting.

Another option is to have PAD light coming at platen 21 at TIR rather than non TIR angles. Generally, light only escapes platen 21 if a platen object is present. So, a subject will not see light since it will be going into their finger.

Figure 10:
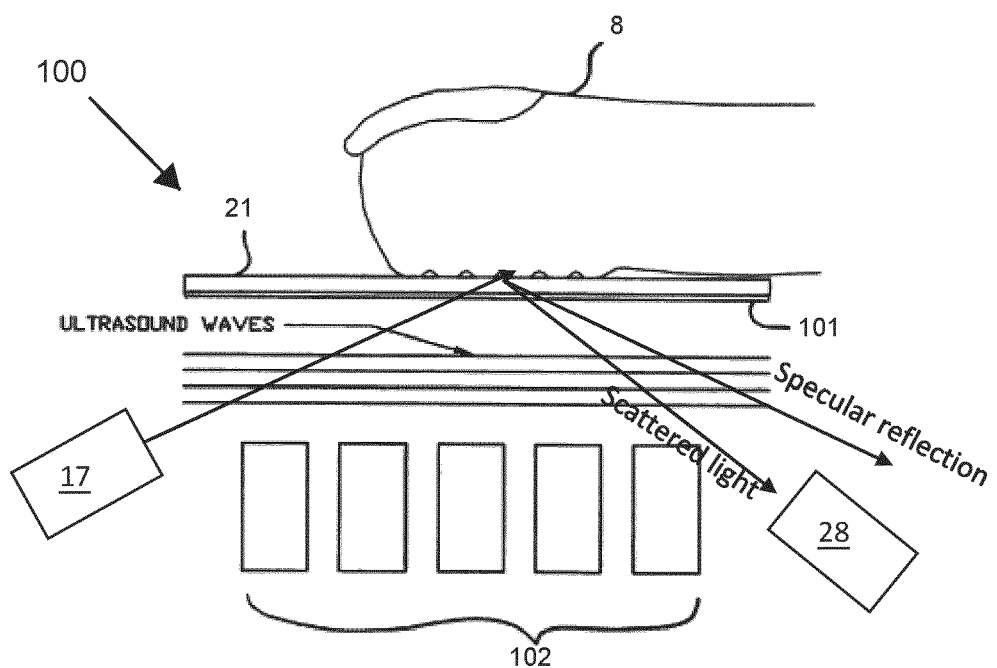
FIG. 10 schematically illustrates a PAD system incorporated into an ultrasonic fingerprint scanner.

FIG. 10 illustrates how the PAD system of the present disclosure may be incorporated into an ultrasonic fingerprint scanner 100 having ultrasonic generators 101 and ultrasonic detectors 102. Provided the platen 21 is transparent to the wavelengths of interest for the PAD analysis, a first illumination module 17 and a first optical imaging module 28 can be added to the ultrasonic fingerprint scanner 100. The specular reflection of the light striking platen 21 may not be directly viewed by first imaging module 28, but rather first imaging module 28 is oriented such that it detects the scattered light from platen 21, which is therefore much more likely to be emanating from the platen object 8 rather than just from the interface of the platen with air.

According to some embodiments, a periodic illumination pattern may be used. For example, a binary pattern may be used and then the contrast of the pattern that is imaged may be measured. A contrast of the periodic pattern will lower the more scatter and lower absorption the platen material has. However, the PAD system may measure fall-off of scatter from an edge of an illuminated area. Such a measurement may be similar to measuring how sharp a focused edge (edge spread function) is for calculating the modulation transfer function (MTF) of a system. The sharper the cutoff from illuminated to non-illuminated, the better in order to determine scatter, transmission, and/or absorption properties of a platen object.

Figure 11:
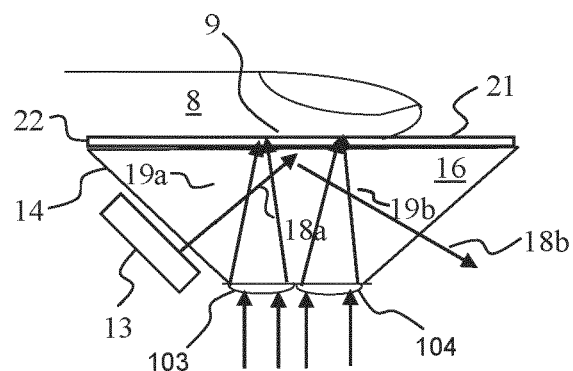
FIG. 11 schematically illustrates the use of micro (or mini) lenses to create focused points of light at a platen.

According to some embodiments, a means other than use of a patterned film at the platen can be used to create a spatially varying illumination pattern. As illustrated in FIG. 11, neither a patterned object 33 nor a film 22 at the platen 21 is required to create a spatially varying intensity pattern. In FIG. 11, two micro (or mini) lenses 103, 104 create two focused points of light at platen 21. These two mini lenses 103, 104 may be part of a larger 1D array of lenticular lenses (or other shapes such as prisms) to create a 1D structure on platen 21 or part of a 2D array for creating a 2D spatially varying pattern on platen 21. One skilled in the art can undoubtedly come up with an arrangement of lenses, mirrors, diffractive, Fresnel, non-imaging optics, microlens, lenticular, patterned film, etc. means of creating a spatially patterned illumination at platen 21.

Figure 12:
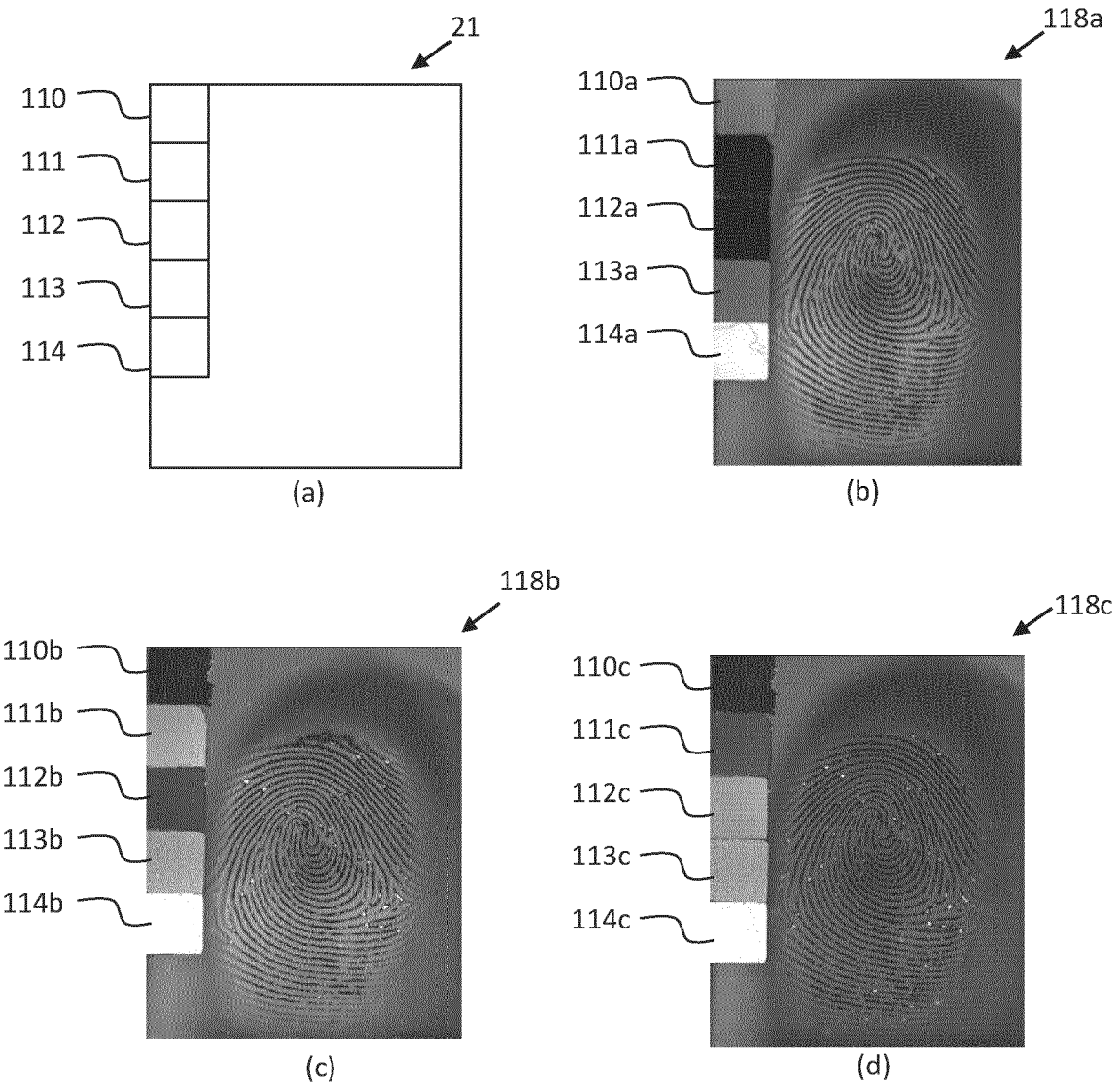
FIGS. 12a-d schematically illustrate the use of color targets affixed to a platen for calibration.

For purposes of calibration of the captured PAD data, color targets (110 through 114) may be affixed to platen 21, as shown in FIGS. 12*a-d*. These color targets may be made out of a variety of materials such as printed paper or colored plastic and preferentially are affixed to the platen with an optical adhesive transparent at the PAD wavelengths of use and care is taken that no air bubbles are caught in the adhesive affixing process. These color targets are preferentially made from a material that produces a uniform color signal with minimal noise. By way of non-limiting example, printing color targets with a color laser printer is less desirable than printing with an inkjet printer on paper as the former has rastering effects when viewed at high resolution, while the latter tends to have ink that bleeds, creating a more uniform color. However, both of these methods are inferior to the use of a plastic that is uniformly dyed to the correct color desired since this produces a more uniform color target. FIGS. 12*b-d*, each illustrate the platen image 118*a-c*, respectively, captured when color targets are affixed to platen 21 for the case of an optical TFT fingerprint sensor. FIGS. 12*b-d* are monochrome images of a platen object 8 touching platen 21 where the illumination light source shining light from underneath the platen is from LEDs that are red, green, and blue. The particular color targets 110 through 114 affixed to the platen used are red, green, blue, gray, and white, respectively, in color. The advantage of having a return signal as part of the image when collecting PAD data is that the average grayscale or other statistical metric of a region within each color block can be calculated and this metric used in order to calibrate the image. By way of example, calibration can be performed by shifting the grayscale of the image to correspond to a constant value for the color target part of the image that corresponds to the same light illumination color for each image collected or may be calibrated to a set constant value one time at the factory during assembly of the apparatus. Calibration is desirable since the illumination light source 33 may potentially decrease in power as well as may appear to have different brightness from apparatus to apparatus because of slightly different performance parameters of one or both of the first illumination and first imaging modules across different apparatus. It is noted that color targets 110*a*, 111*b*, and 111*c* are light gray because these correspond to red, green, and blue color targets illuminated with red, green, and blue LED illumination, respectively.

According to some embodiments, the spatial pattern, polarization, color, etc. of the optical illumination for PAD analysis may change randomly or as a function of the number of attempts performed in a certain time frame in order to prevent someone trying to learn how the object is being detected as a spoof. An operator of a PAD system may want to prevent someone from being able to try multiple times in a certain time period and just learn how to hack the system. Alternatively or additionally, the spatial pattern, polarization, color, etc. of the optical illumination for PAD analysis may change from device to device. Therefore, if someone learns how to defeat one scanner, any learned information does not necessarily translate to another device in the field.

Figure 8:
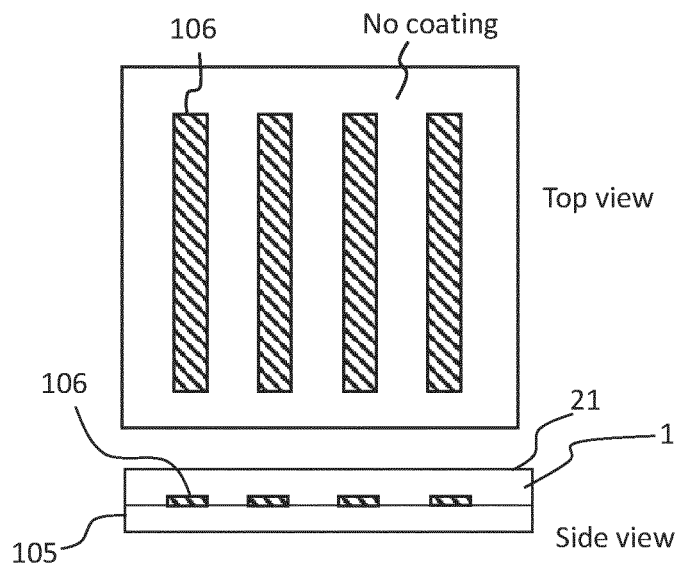
FIG. 8 schematically illustrates top and side views of a structure incorporating a spectrally dependent coating near a platen surface.

FIG. 8 illustrates how a coating at or near the platen surface may be incorporated. The top down and side view of such a platen coating is illustrated. An optically clear substrate 105, such as glass, may be coated and patterned with a spectrally dependent coating 106, which then may or may not be coated with a protective coating 107. As described earlier, a coating that changes its transmission as a function of wavelength is desirable for the case of a fingerprint scanner that captures optical images for fingerprint identification. However, for other non-optical scanning technologies, the coating need not be spectrally dependent. For example, with an ultrasonic fingerprint scanner, coating 106 can just be transmissive to ultrasound waves and not significantly disrupt them compared to the non-patterned areas of the platen. Note that patterned coating 106, may also serve another purpose in the scanner. For example, the coating may be used for another modality of PAD analysis, such as the use of indium-tin-oxide (ITO) patterned on a platen to determine electrical properties of the platen object. Patterned transparent electrode coatings may be designed such that at certain wavelengths, angles, and polarizations, there is a significant amount of reflection and they therefore create a spatially varying illumination pattern with one or more sets of dark and light illumination areas for purposes of PAD data collection. But, preferentially for a different wavelength, incident angle, and polarization set, light is minimally affected by the patterned electrodes and a reasonably uniform illumination of the platen is achieved for the purposes of fingerprint identification.

Figure 13:
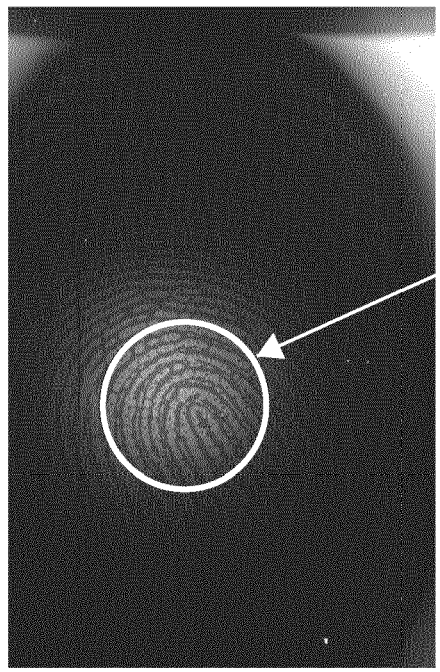
FIGS. 13a-c include optical images of a real finger and a spoof produced from a fingerprint scanner.
Figure 13:
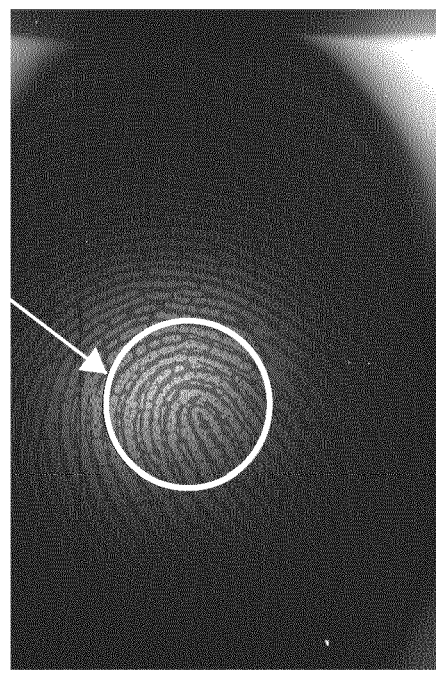
Figure 13:
Figure 14:
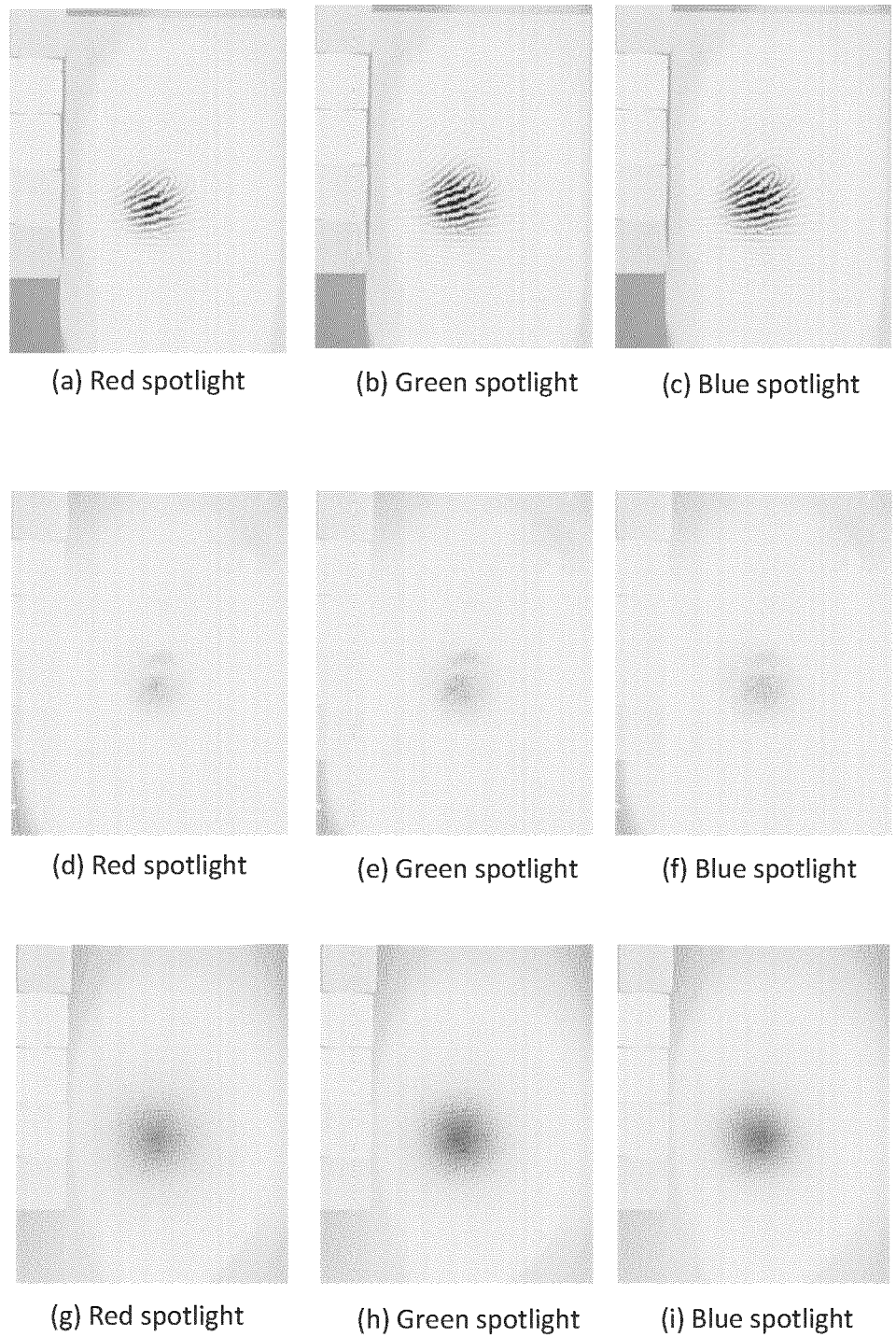
FIGS. 14a-i illustrate additional examples of light scatter for sample red, green, and blue spotlight illumination for a fingerprint spoof on paper, a fingerprint spoof impression, and a real finger.

FIGS. 13*a-c* depict optical TFT images produced from a scanner, according to some embodiments. Note that circle 131 is same diameter in both images (a) and (b). Image (b) shows red light scatters further. With gelatin or other spoofs that are clear, as shown in image (c), the spot is substantially or completely diffused. Image (c) is of red single spotlight illumination where a single spotlight is located at a corresponding place as in images (a) and (b) above that were for a real finger. However, for gelatin and other reasonably clear spoofs, light transmits therethrough, then hits the finger behind the spoof, and the skin scatters light in all directions. However, since skin is separated from the TFT sensors by 1 mm or more, light illuminates the entire fingerprint of the spoof and a spotlight image is no longer seen in response. It is generally easy for a PAD algorithm to distinguish a spotlight image of a real finger from these transparent spoofs by looking at areas in the spoof image that should be much darker were it really a bona fide presentation. FIGS. 14a-i illustrate additional examples of light scatter for sample red, green, and blue spotlight illumination for a fingerprint spoof on paper (FIGS. 14a-c), a fingerprint spoof (impression) using a hydrophilic impression material, such as vinyl polysiloxane (VPS), and conductive graphite (FIGS. 14d-f), and a real finger (FIGS. 14g-i).

Figure 15:
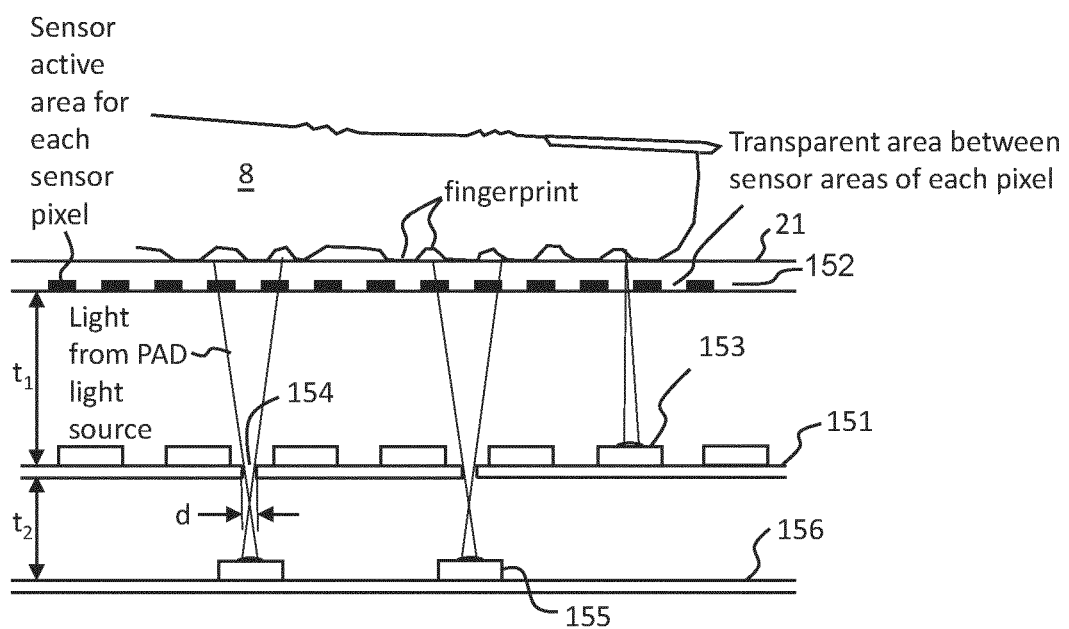
FIG. 15 schematically illustrates modifications to a main illumination board for accommodating PAD LEDs.

As illustrated in FIG. 15, the main illumination board (e.g., LED PCB) 151 for a TFT sensor (e.g., sensor array) 152 may include an array of LEDs 153, with or without a lens or lens system. These LEDs 153 may be single color LEDs or multi-color LED packages whereby multi-color includes LED packages or array sub-grouping with LEDs having a plurality of center wavelengths where said center wavelengths are chosen from the wavelength spectrum spanning UV, visible, and NIR wavelengths. This array of LEDs 153 is the second illumination module and is designed for identification of fingerprints. For some embodiments, modifications of this array of LEDs for purposes of use in PAD will now be described. One or more apertures or through holes 154 may be constructed in the main LED PCB 151 allowing for one or more additional LEDs 155, with or without a lens or lens system, to be mounted underneath the main LED PCB, either to the same PCB or a different PCB 156 (such as a PAD LED PCB, or first illumination module). For any given through hole and corresponding LED(s), based upon the diameter of the through hole d, thickness of the through hole, the distance the PAD LED is placed from the hole $t_2$, and the distance the main LED PCB $t_1$ is from the platen 21, the vignetting of the PAD LED light is determined and the spot size on the platen may be calculated. To guide more light from a PAD LED 155 through a hole 154 in the main LED PCB 151, the PAD LED may have an optional lens system directly above it and underneath the main LED PCB. To help focus the light that reaches the hole in the main LED PCB 151, an optional lens system may be placed at the main LED PCB hole or above it to guide and focus the light. Note that for these two cases involving lens systems, the lens system may be a collection of one or more refractive, diffractive, Fresnel, reflective, or freeform optical elements designed to image or non-image the LED light into an illumination pattern of interest at the platen 21. Alternatively, or in conjunction with a PAD LED PCB 156, one or more LEDs 153 on the main LED PCB 151 may be lensed or not lensed and addressed individually or in subsets as compared to the entire array that serves to provide uniform illumination at platen 21. By separately illuminating one or more LEDs 153 across the main LED PCB 151, these one or more LEDs may achieve the nonuniform illumination described herein for PAD illumination.

With regards to FIG. 7, where a light pipe 88 is used to relay LED light from an LED 87 that is underneath the fingerprint illumination LED array 82, other non-imaging optical structures may be used. For example, fiber optics may be utilized. An optical fiber may be coupled to one or more additional LEDs 87 that are mounted below the fingerprint illumination LED array 82 and bring the light to the platen surface. The numerical aperture (NA) of the fiber along with the distance the fiber terminates below the platen will determine the spot area that is illuminated by the fiber. Alternatively or additionally, multiple optical fibers may be coupled to an LED so that light from one LED is used to create multiple illumination spots on the platen surface.

Figure 16A:
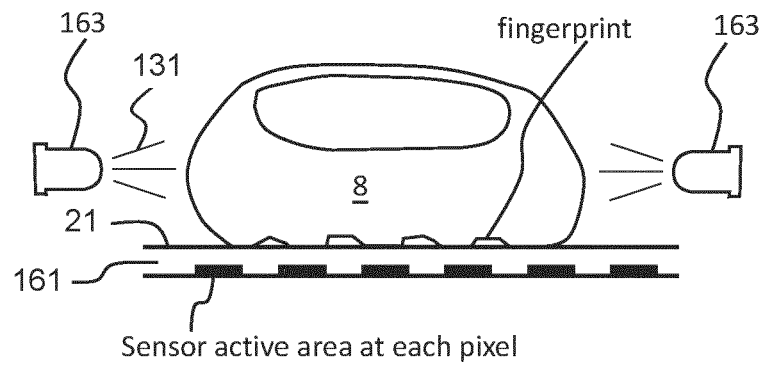
FIG. 16a-d schematically illustrate various fingerprint scanning apparatus wherein the illumination light for PAD analysis does not originate under the platen.

FIGS. 16a-d illustrate schematics of several fingerprint scanning apparatus wherein the illumination light for the PAD analysis does not originate under the platen 21, but rather above the platen. In the embodiments illustrated, the illumination is directed towards the platen object 8 (for example, a finger) at one or more directions from the side, but said illumination could originate from above the platen object as well. In FIG. 16a, platen object 8 illumination is illustrated for the case where the platen 21 is in very close (few mm or less) proximity to sensor 161 (detector), where, by example, the sensor might be a TFT sensor array as previously described. The light 162 from one or more light sources 163, such as any of those previously discussed, illuminates the finger 8 from one or more sides, and the scattered light that the finger tissue transmits will be read by the sensor 161. The PAD algorithm can examine the captured PAD data image and look at how the scattered light emits out to the sensor as a function of the distance from the skin topology that is directly illuminated.

Figure 16B:
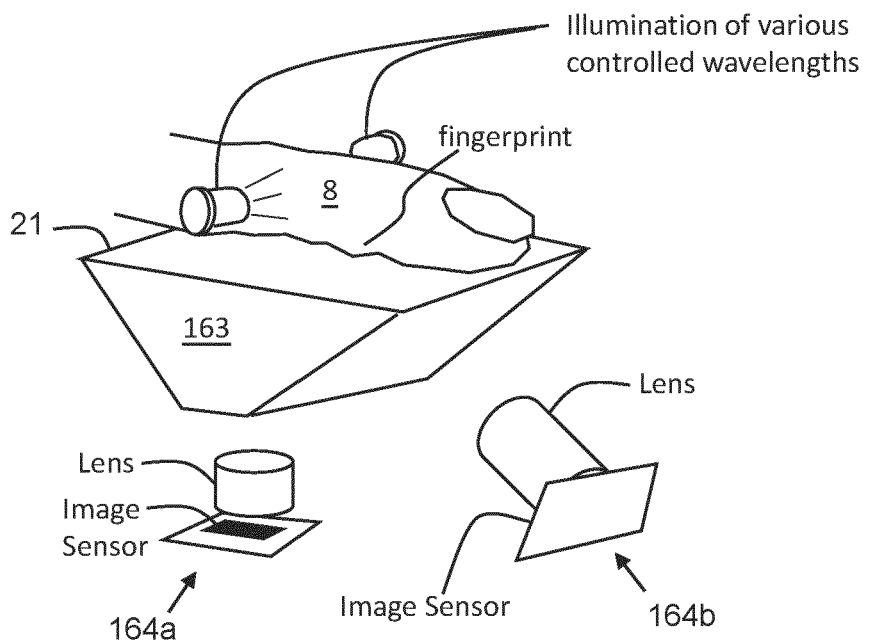

In FIG. 16b, a similar side-illuminated platen object 9 (for example, a finger) is shown on a platen 21, but now in a 3D schematic and where the platen is part of a prism-based system 163, as previously described. FIG. 16b also illustrates that there may be more than one imaging module 164a, 164b, as previously described herein. In this embodiment, the PAD illumination that is scattered by finger 8 may be viewed by one or more of an imaging module 164a located directly under the prism 163 and an imaging module 164b located at a TIR angle with respect to the platen 21 surface. The imaging module for purposes of fingerprint identification may also be one or more of these imaging modules 164a, 164b.

Figure 16C:
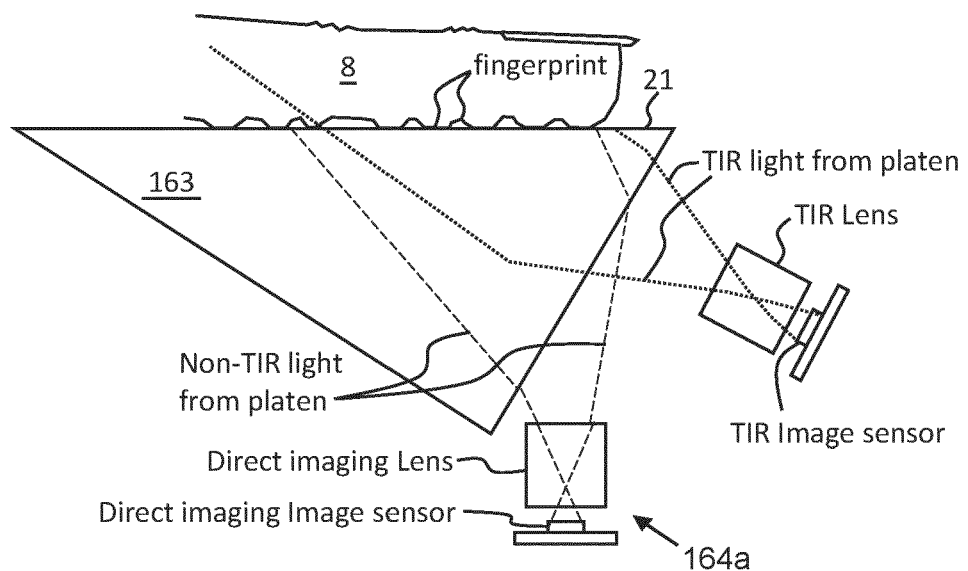

In FIG. 16c, a modification of the embodiment shown in FIG. 16b is illustrated in 2D (above-platen illumination modules not shown for ease of illustration) illustrating that direct imaging image module 164a may be located at a different prism facet of prism 163 than one parallel to the platen 21 surface, as was the illustrated in FIG. 16b.

Figure 16D:
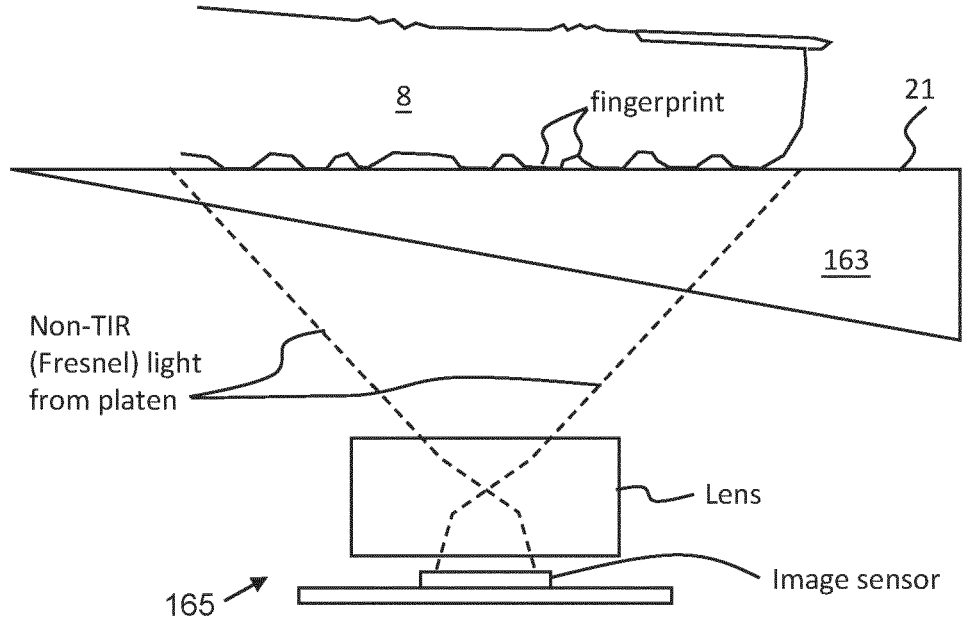

In FIG. 16d, a modification of the embodiment shown in FIG. 16b is illustrated in 2D (above-platen illumination modules not shown for ease of illustration) illustrating the prism 163 may be a non-TIR prism, but a Fresnel reflection prism for purposes of fingerprint identification. The imaging module 165, comprising a lens and sensor, as previously described herein, may be used for PAD data imaging and also for fingerprint identification.

Referring back to FIG. 9, the lightguide 91 may have one or more embedded structured areas 92 of one or more of holograms, micromirrors, diffuse areas, liquid crystals, etc. to direct light toward the platen 21. This may be designed to work not just with edge illuminated light, but additionally or alternatively with light of other angles of incidence, such as light coming in from below which may or may not be in TIR relative to the platen boundary. Also, light may be directed toward platen 21, not only at normal incidence as illustrated, but at any other desired angle.

The description of the disclosed embodiments may be used with respect to fingerprint scanners. However, the embodiments being described may use spatially varying light to determine the internal transmission and scatter properties of a material. Therefore, the disclosed embodiments may also be extended to features of the face for use in PAD algorithms when conducting face or iris biometrics. For example, one or more of the cheek skin, forehead skin, or nose can be examined with spatially varying light to determine if these areas of the head scatter/absorb light in a manner typical of these areas of the face. In another example, the light scattering/absorption properties of one of more of the eyelids, sclera, and iris can be examined using the disclosed embodiments.

With regards to the construction of a presentation attack detection (PAD) algorithm that includes the use of artificial intelligence (AI), the PAD system may perform a certain amount of preprocessing of the image data. Noise reduction image processing algorithms may be utilized, which, by way of example, may be through frame averaging of successive sensor images and/or through use of a low-pass filter operations such as a Guassian convolution of the image data. Often, in order to better train an AI, such as one incorporating convolutional neural networks (CNNs), fully convolutional networks (FCNs), and/or Long Short-Term Memory (LSTM), the more data, the better. Therefore, for an AI PAD algorithm, the PAD system may train and test with platen image patch data rather than using the entire platen image as a single input into the AI algorithm. Patches derived from the platen data may be derived from where the platen object 8 is touching the platen 21 and based upon the symmetry of the patterned illumination.

Figure 17:
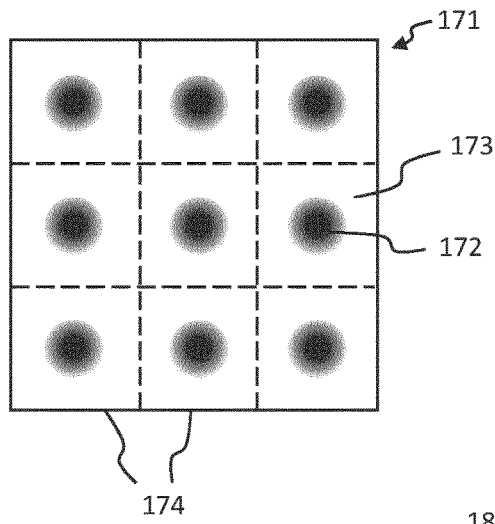
FIG. 17 schematically illustrates an example of a platen image obtained from a patterned illumination that consists of an M×O array of circular shadow or dark areas surrounded by bright illumination.

The platen image of the current invention may consist of one or more regions of illumination or shadows. FIG. 17 illustrates an example of a platen image 171 obtained from a patterned illumination that consists of an M×O array (in this case, a 3×3 array) of circular shadow or dark areas 172 surrounded by bright illumination 173 (e.g., N subimages 174). Though FIG. 17 illustrates a repeating array of circular dark spots 172, it should be noted that these shadowed regions may also be other shapes such as squares, rectangles, triangles, or polygons, such as hexagons (preferably regular hexagons). Additionally, the platen illumination may consist of a combination of different shapes, for example the illumination may have a combination of circular, square, and line shadows (or illumination) within the same illumination event, or across different illumination events in a given PAD illumination sequence. As previously disclosed, it may be preferential to analyze the fingerprint image and determine if the platen object is touching equally all of the shadowed areas or only some of them. Based upon the location of the platen object and what illuminated areas or shadowed areas are covered by this object, as well as how much of the area outside of these illuminated areas or shadowed areas are covered, may determine how the patches to be analyzed by the PAD AI are constructed. In one example, software may determine that the entire platen is covered by a platen object, and therefore all N subimages (in the case of FIG. 17, N=9), where the boundary of the N subimages abut each other. Alternatively, software may determine that the platen object does not completely fill one or more of the areas of the N subimages 174 and only a subset of the N subimages are used. Still alternatively, it may be determined that the areas where the platen object does not touch a subimage 174 may be small and that if each subimage included a different shape (for example, rectangular or square, and possibly not abutting) that more subimages could be used in the PAD AI code.

Figure 18:
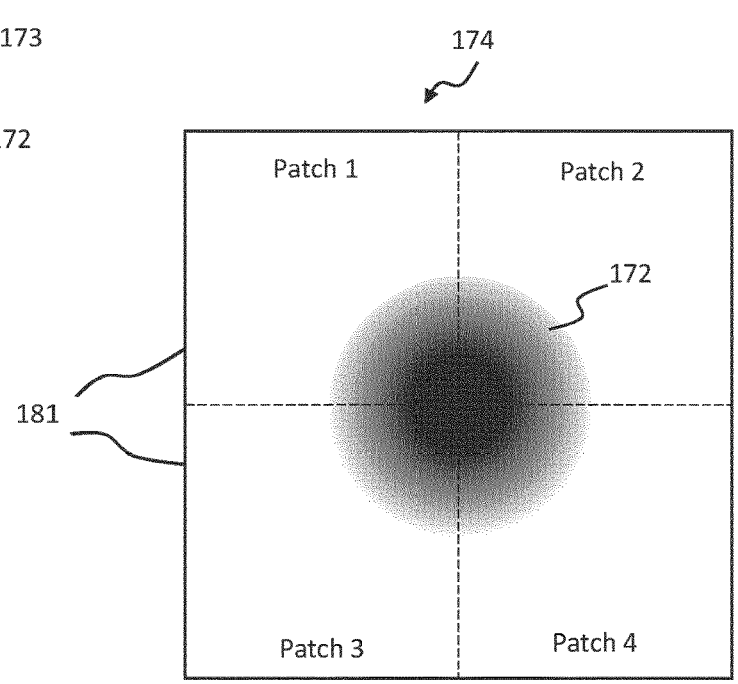
FIG. 18 schematically illustrates an example subimage from the platen image of FIG. 17 divided into patches based upon symmetry of the illumination pattern.
Figure 19:
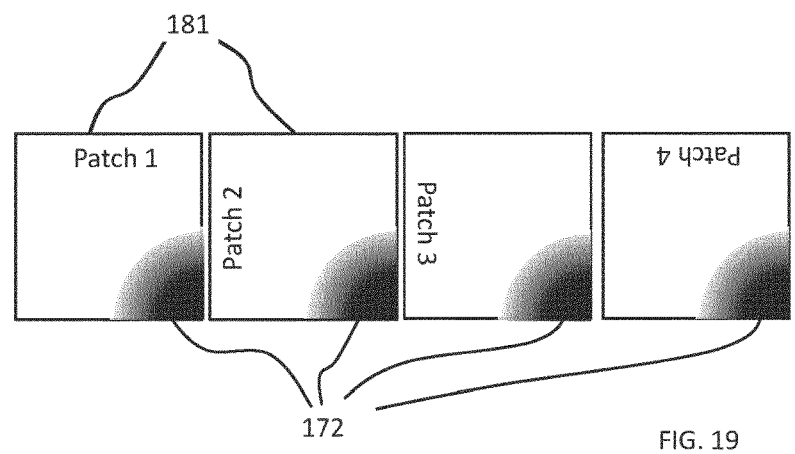
FIG. 19 schematically illustrates the patches of FIG. 18 rotated and/or flipped so that the illumination orientation of each patch is the same or generally the same.

Once the subimages 174 to analyze have been determined, these subimages may be fed into the PAD AI algorithm. However, the subimages 174 may be further divided into patches and then each patch fed into the PAD AI algorithm. FIG. 18 illustrates an example subimage 174 from the platen image 171 divided into patches 181 based upon the symmetry of the illumination pattern. Each patch image 181 may be rotated and/or flipped so that the illumination orientation of each patch is the same or generally the same, as illustrated in FIG. 19. These rotated (or flipped) patches 181 may be fed as inputs to the PAD AI algorithm. Because the illumination pattern of the example subimage 174 of FIG. 18 is circular, a 4-fold symmetry as shown can be chosen, where the image is divided into quadrants. However, since a circle has an infinite number of axes of symmetry, the subimage 174 could have been divided into other numbers of patches 181, as will be described in more detail later. In another example, the illumination pattern of a subimage 174 may be, for example, a centered triangular, square, hexagonal, or an octagonal shape, in which case the patches 181 generated may be based upon a respective 3-, 4-, 6-, and 8-fold symmetry of the illumination pattern. Note that when using symmetry that does not equally divide the subimage 174 (such as a fold other than 2 or 4), the entire subimage does not need to be accounted for in the patches 181, and portions, such as the corners, of the subimage need not be included.

Figure 20:
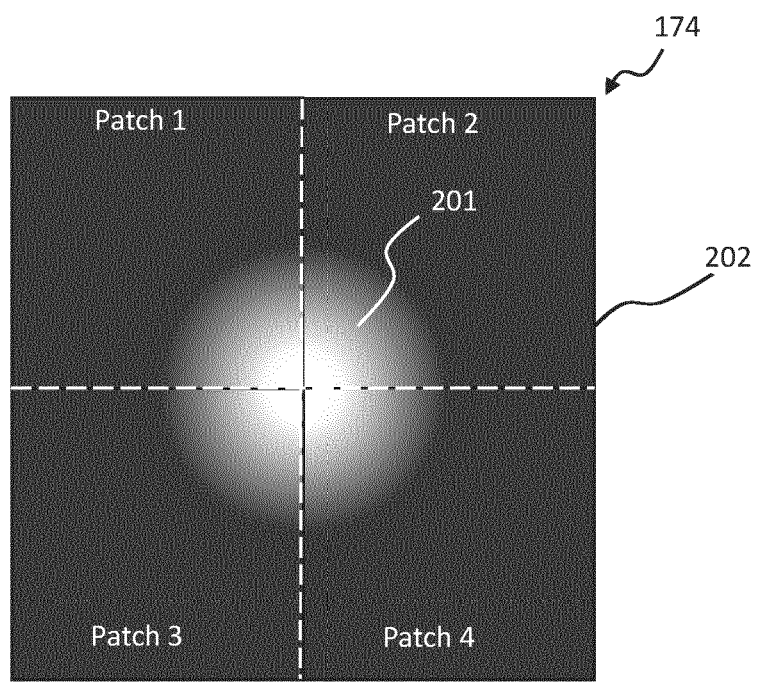
FIG. 20 schematically illustrates another example of a subimage that is generally the inverse of that in FIG. 18, in which there is an illuminated spot at the center of the subimage surrounded by dark illumination.
Figure 21:
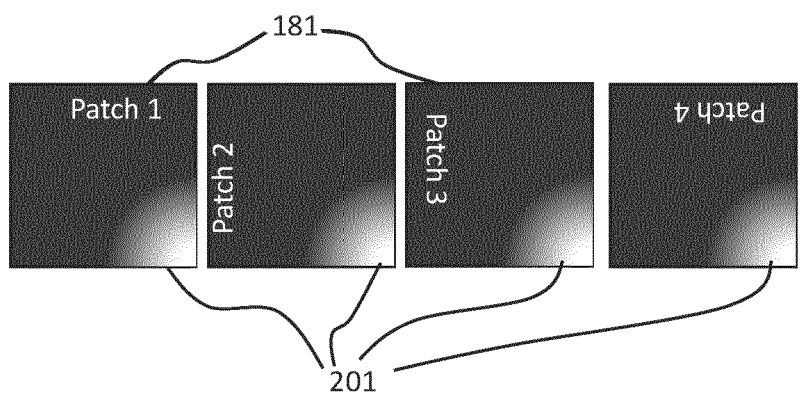
FIG. 21 schematically illustrates patches from FIG. 20 rotated and/or flipped so that the illumination orientation of each patch is the same or generally the same.
Figure 22:
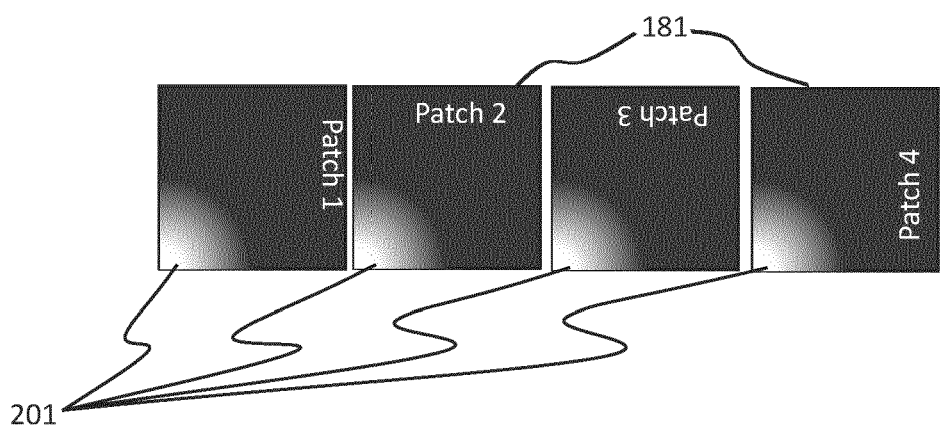
FIG. 22 also schematically illustrates patches from FIG. 20 rotated and/or flipped so that the illumination orientation of each patch is the same or generally the same.

FIG. 20 illustrates another example of a subimage 174 that is generally the inverse of that in FIG. 18, in which there is an illuminated spot 201 at the center of the subimage surrounded by dark illumination 202. This subimage 174 may similarly be divided into patches 181 based upon, for example, quadrants or other symmetry of the subimage, as shown, and the patches rotated and/or flipped so that the illumination pattern has the same orientation across each patch, as illustrated in FIG. 21, where the illumination of each patch is located, for example, at the bottom right of the patch, and in FIG. 22, where the illumination of each patch is located, for example, at the bottom left of each patch.

Figure 23A:
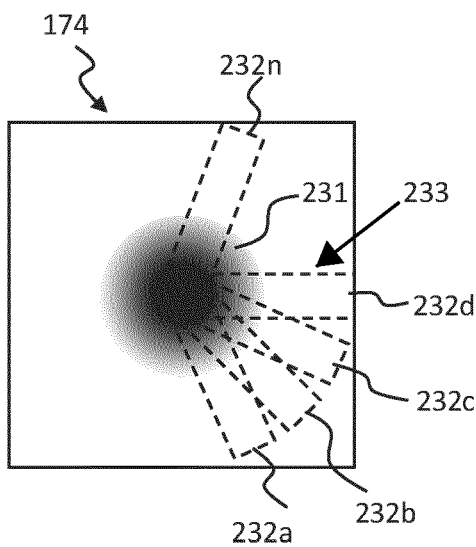
FIGS. 23a-b schematically illustrate an example generation of patches from a subimage by rotating a rectangular or other suitably-shaped aperture about the center of an illumination pattern.
Figure 23B:
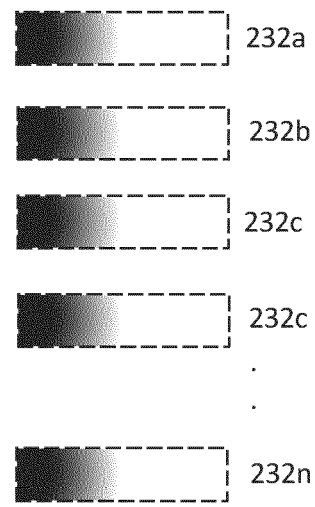
Figure 24A:
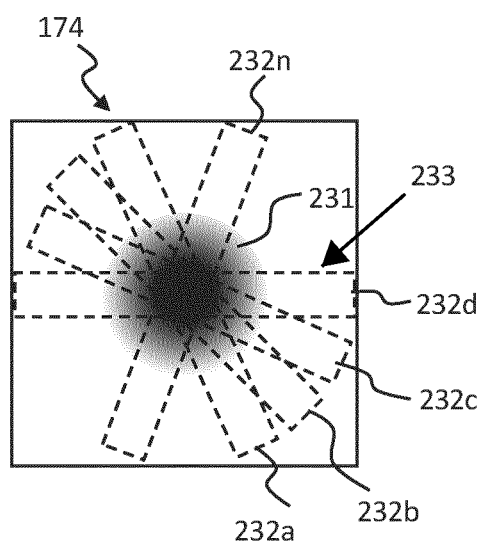
FIGS. 24a-b schematically illustrate another example generation of patches from a subimage by rotating a rectangular or other suitably-shaped aperture about the center of an illumination pattern.
Figure 24B:
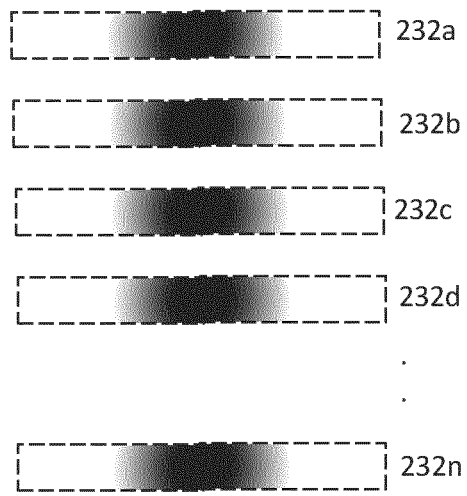

As mentioned earlier, the patches 181 generated from a subimage 174 need not collectively describe the entire subimage, nor need they be distinct regions of the subimage. As an example, consider the geometry of FIG. 23*a* where the subimage 174 comprises a centered illumination shadow 231. A series of n patches 232*a-n* may be generated by rotating a rectangular or other suitably-shaped aperture 233 about the center of the illumination shadow 231, resulting in the series of patches, illustrated for example, in FIG. 23*b*. The location of the rectangular or other suitably-shaped aperture 233 relative to the center of the illumination shadow 231 may be adjusted. For example, as illustrated in FIG. 24*a*, the point of rotation of the rectangular aperture 233 that is rotated in order to define n patches 232*a-n* need not correspond with a side of the rectangle. In general, the point of rotation for the rectangular or other suitably-shaped aperture 233 may be any point within, on, or outside of the rectangular or other suitably-shaped aperture, so that n patches 232*a-n*, such as those in FIGS. 23*b* and 24*b* may be obtained. Any cross-sections algorithm, whether the resulting patches 232*a-n* are overlapping or not or use all of the image points of the original subimage 174 or not, that one skilled in the art may derive can be used, as long as the resulting patches have illumination patterns that are consistent across the image patches.

Figure 25:
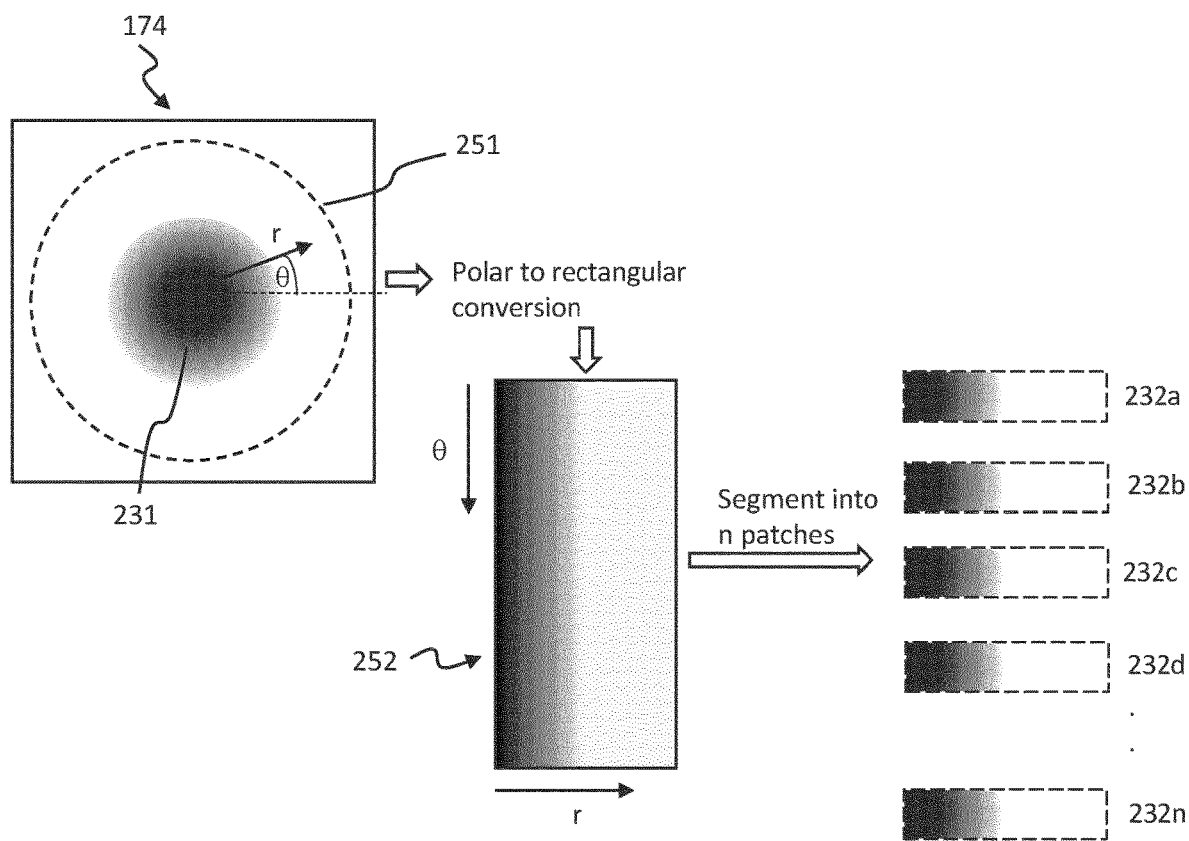
FIG. 25 schematically illustrates an example generation of patches from a subimage using polar coordinates of a circular aperture centered on the center of an illumination pattern.

As a further example of how patches may be generated, consider the subimage 174 of FIG. 25 comprising a circularly symmetric illumination pattern 231. A circular aperture 251 may be defined with its center corresponding to the center of symmetry of the illumination pattern 231. The image PAD data from the sensor within that circular aperture 251 may be represented as polar coordinates (r, θ) and represented in a rectangular dataset 252. The resulting rectangular dataset 252 may be segmented into nonoverlapping or overlapping patches 232*a-n* as illustrated.

Note that the patch data as input into the PAD AI algorithm may include a third or higher dimension that define(s) the illumination used for the PAD image data, for instance, color, illumination angle, and polarization.

The PAD AI may be trained to input patches from subimages 174 and generate a PAD score for each patch and then the overall PAD score for the platen object obtained from the fusion or mathematical combination of these scores. Alternatively, a PAD score for each subimage 174 may be calculated based upon its corresponding patches and these subimage PAD scores can be fused or mathematically combined to obtain the overall PAD score. An embodiment of a fusion algorithm is an arithmetic average.

It should be noted that in the description of the disclosed embodiments, when a spot or pattern of illumination is described or drawn, the inverse of the pattern is also covered by this disclosure. In other words, the teachings of how one or more spots of illumination may be projected onto a fingerprint scanner platen and how the subsequent image from this illumination pattern might be analyzed to develop a PAD algorithm or calculate a PAD score can also be applied to the case of one or more shadows or dark areas of illumination within a bright illumination area, and vice versa.

As noted above, it should be understood that the word fingerprint or finger is meant to refer to not just a fingerprint or a finger but rather to any skin topology and any type or portion of skin (for example fingers, thumbs, palms, toes, etc.).

From the foregoing description, it will be apparent that there has been provided an improved non-imaging contact fingerprint sensor. Variations and modifications in the herein described sensor, and method of use will undoubtedly suggest themselves to those skilled in the art. Accordingly, the foregoing description should be taken as illustrative and not in a limiting sense.

The invention claimed is:

1. A system for presentation attack detection (PAD) using machine learning, the system comprising:
   a platen for receiving a first object thereon, wherein the platen is transmissive to an optical wavelength of light;
   an illumination module configured to illuminate at least a portion of the first object with illumination from an illumination source, wherein the illumination is spatially patterned prior to reaching the at least a portion of the first object;
   an optical sensing module configured to receive the spatially patterned illumination after the spatially patterned illumination interacts with the at least a portion of the first object; and
   a trained PAD machine learning algorithm configured to receive image data based on the spatially patterned illumination received at the optical sensing module and detect whether the image data corresponds to a presentation attack, the PAD machine learning algorithm trained for PAD by:
      obtaining a platen image generated from spatially patterned light of a second object at a platen surface;
      determining at least a subimage of the platen image and dividing the subimage of the platen image into a plurality of patches; and
      feeding the plurality of patches to the PAD machine learning algorithm to train the algorithm.

2. The system of claim 1, wherein the illumination module is configured to at least partially create the spatially patterned illumination.

3. The system of claim 2, wherein the illumination module comprises a patterned object with spatially varying differences in at least one of optical transmission or reflection for at least partially creating the spatially patterned illumination.

4. The system of claim 1, wherein the platen comprises a patterned optical coating at least partially creating the spatially patterned illumination.

5. The system of claim 1, wherein the illumination module comprises a lightguide comprising one or more structured areas that direct light toward the platen to at least partially create the spatially patterned illumination.

6. The system of claim 5, wherein the one or more structured areas comprise one or more of a reflective mirror, hologram, diffractive element, or ground or rough area of material.

7. The system of claim 1, wherein the spatially patterned illumination comprises a plurality of discrete areas of different illumination intensity.

8. The system of claim 7, wherein the spatially patterned illumination comprises a stepped pattern of at least three discrete areas of different illumination intensity.

9. The system of claim 1, wherein the spatially patterned illumination comprises a gradient of different illumination intensity.

10. The system of claim 1, wherein the spatially patterned illumination comprises wavelengths of different colors.

11. A method for training machine learning for presentation attack detection (PAD), the method comprising:
    obtaining a platen image generated from spatially patterned illumination of an object at a platen surface;
    determining at least a subimage of the platen image and dividing the subimage into a plurality of patches; and
    feeding the plurality of patches to a PAD machine learning algorithm for training the algorithm.

12. The method of claim 11, wherein determining at least a subimage of the platen image comprises determining a plurality of subimages of the platen image and dividing each subimage into a plurality of patches.

13. The method of claim 11, wherein dividing a given subimage into a plurality of patches comprises dividing the given subimage into a plurality of patches based on symmetry of the subimage.

14. The method of claim 13, wherein each of the plurality of patches of the given subimage is centered around a center of the given subimage.

15. The method of claim 14, wherein each of the plurality of patches of the given subimage comprises a predetermined shape having an end aligned with the center of the given subimage or a predetermined shape having an axis of rotation aligned with the center of the given subimage.

16. The method of claim 15, wherein the predetermined shape is one of a square, rectangle, or triangle.

17. The method of claim 11, wherein dividing a given subimage into a plurality of patches comprises representing the subimage as a rectangular dataset based on polar coordinates of the subimage and segmenting the rectangular dataset into the plurality of patches of the given subimage.

18. The method of claim 11, further comprising orienting the plurality of patches based on symmetry of the subimage such that the plurality of patches are similarly oriented prior to feeding the plurality of patches to the PAD machine learning algorithm.

19. The method of claim 11, wherein at least a portion of at least one patch of a given subimage overlaps with a portion of at least one other patch of the given subimage.

20. The method of claim 11, wherein each patch of a given subimage comprises a distinct portion of the given subimage.

* * * * *